United States Patent
Olmstead

(10) Patent No.: US 8,261,990 B2
(45) Date of Patent: Sep. 11, 2012

(54) DATA READER HAVING COMPACT ARRANGEMENT FOR ACQUISITION OF MULTIPLE VIEWS OF AN OBJECT

(75) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 181 days.

(21) Appl. No.: 12/645,984

(22) Filed: Dec. 23, 2009

(65) Prior Publication Data

US 2010/0163626 A1  Jul. 1, 2010

Related U.S. Application Data

(60) Provisional application No. 61/140,930, filed on Dec. 26, 2008.

(51) Int. Cl.
| | |
|---|---|
| *G06K 7/10* | (2006.01) |
| *G06K 15/12* | (2006.01) |
| *G06K 7/00* | (2006.01) |
| *G06K 7/14* | (2006.01) |
| *G02B 26/08* | (2006.01) |

(52) U.S. Cl. ......... 235/462.41; 235/462.01; 235/462.22; 235/435; 235/454

(58) Field of Classification Search .................. 235/454, 235/462.01, 462.41, 462.22, 435
See application file for complete search history.

(56) References Cited

U.S. PATENT DOCUMENTS

| | | | |
|---|---|---|---|
| 3,826,562 A | 7/1974 | Baumgardner et al. | |
| 5,019,714 A | 5/1991 | Knowles | |
| 5,073,702 A | 12/1991 | Schuhmacher | |
| 5,308,966 A | 5/1994 | Danielson et al. | |
| 5,446,271 A | 8/1995 | Cherry et al. | |
| 5,469,294 A | 11/1995 | Wilt et al. | |
| 5,493,108 A | 2/1996 | Cherry et al. | |
| 5,627,366 A | 5/1997 | Katz | |
| 5,646,390 A | 7/1997 | Wang et al. | |
| 5,677,522 A * | 10/1997 | Rice et al. | ................ 235/454 |
| 5,682,030 A | 10/1997 | Kubon | |

(Continued)

FOREIGN PATENT DOCUMENTS

CA  2 457 022 A1  10/2003

(Continued)

OTHER PUBLICATIONS

International Search Report for PCT Patent Application No. PCT/US2007/071590, published Feb. 21, 2010.

(Continued)

*Primary Examiner* — Daniel Walsh
(74) *Attorney, Agent, or Firm* — Stoel Rives LLP

(57) ABSTRACT

A data reader including one or more imagers, the data reader having fold mirrors (130) that permit the imagers (60) to be closer to each other and permit an optical code reader housing (82) to confine them to a smaller housing volume or capacity. A plurality of sets of fold mirrors (130) can also be employed to convey at least a portion of at least two different perspectives of a view volume (134) to different regions of an image field of a common imager (60). The sets of fold mirrors (130) may also include one or more split mirrors that have mirror components that reflect images from different view volumes (134) to different imagers (60) or different regions of an image field of a single imager (60).

19 Claims, 18 Drawing Sheets

U.S. PATENT DOCUMENTS

| | | | |
|---|---|---|---|
| 5,717,195 A | | 2/1998 | Feng et al. |
| 5,723,852 A * | | 3/1998 | Rando et al. ............... 235/462.4 |
| 5,737,122 A | | 4/1998 | Wilt et al. |
| 5,801,370 A * | | 9/1998 | Katoh et al. ............. 235/462.01 |
| 5,804,805 A | | 9/1998 | Koenck et al. |
| 5,814,803 A | | 9/1998 | Olmstead et al. |
| 5,886,336 A * | | 3/1999 | Tang et al. ............... 235/462.43 |
| 5,894,530 A | | 4/1999 | Wilt |
| 5,909,276 A | | 6/1999 | Kinney et al. |
| 5,936,218 A * | | 8/1999 | Ohkawa et al. .......... 235/462.01 |
| 5,984,186 A * | | 11/1999 | Tafoya ..................... 235/462.24 |
| 6,000,619 A | | 12/1999 | Reddersen et al. |
| 6,019,286 A | | 2/2000 | Li et al. |
| 6,053,408 A | | 4/2000 | Stoner |
| 6,061,091 A | | 5/2000 | Van de Poel et al. |
| 6,076,735 A * | | 6/2000 | Saegusa .................... 235/462.4 |
| 6,142,376 A | | 11/2000 | Cherry et al. |
| 6,257,490 B1 | | 7/2001 | Tafoya |
| 6,273,336 B1 | | 8/2001 | Rudeen et al. |
| 6,295,077 B1 | | 9/2001 | Suzuki |
| 6,296,187 B1 | | 10/2001 | Shearer |
| 6,318,635 B1 | | 11/2001 | Stoner |
| 6,318,637 B1 | | 11/2001 | Stoner |
| 6,336,587 B1 | | 1/2002 | He et al. |
| 6,365,907 B1 | | 4/2002 | Staub et al. |
| 6,518,997 B1 | | 2/2003 | Chow et al. |
| 6,559,448 B1 | | 5/2003 | Muller et al. |
| 6,609,660 B1 | | 8/2003 | Stoner |
| 6,705,528 B2 | | 3/2004 | Good et al. |
| 6,899,272 B2 * | | 5/2005 | Krichever et al. ....... 235/462.37 |
| 6,963,074 B2 | | 11/2005 | McQueen |
| 6,971,580 B2 | | 12/2005 | Zhu et al. |
| 6,991,169 B2 | | 1/2006 | Bobba et al. |
| 7,014,113 B1 | | 3/2006 | Powell et al. |
| 7,128,266 B2 | | 10/2006 | Zhu et al. |
| 7,188,770 B2 | | 3/2007 | Zhu et al. |
| 7,198,195 B2 * | | 4/2007 | Bobba et al. ............. 235/462.38 |
| 7,201,322 B2 | | 4/2007 | Olmstead et al. |
| 7,204,420 B2 | | 4/2007 | Barkan et al. |
| 7,213,762 B2 | | 5/2007 | Zhu et al. |
| 7,234,641 B2 | | 6/2007 | Olmstead |
| 7,273,180 B2 | | 9/2007 | Zhu et al. |
| 7,296,744 B2 | | 11/2007 | He et al. |
| 7,398,927 B2 | | 7/2008 | Olmstead et al. |
| 7,490,770 B2 | | 2/2009 | Shearin |
| 7,533,819 B2 | | 5/2009 | Barkan et al. |
| 7,757,955 B2 * | | 7/2010 | Barkan ..................... 235/462.01 |
| 7,780,086 B2 * | | 8/2010 | Barkan et al. ............ 235/462.32 |
| 2001/0009508 A1 | | 7/2001 | Umemoto et al. |
| 2001/0032884 A1 | | 10/2001 | Ring et al. |
| 2001/0042789 A1 * | | 11/2001 | Krichever et al. ....... 235/462.14 |
| 2002/0043561 A1 * | | 4/2002 | Tsikos et al. .................. 235/454 |
| 2002/0088859 A1 | | 7/2002 | Bengala |
| 2004/0031851 A1 | | 2/2004 | Bianculli et al. |
| 2004/0051062 A1 | | 3/2004 | Gehring et al. |
| 2004/0175038 A1 | | 9/2004 | Bonner et al. |
| 2004/0223202 A1 | | 11/2004 | Lippert et al. |
| 2005/0103857 A1 | | 5/2005 | Zhu et al. |
| 2006/0022051 A1 | | 2/2006 | Patel et al. |
| 2006/0032919 A1 | | 2/2006 | Shearin |
| 2006/0151604 A1 | | 7/2006 | Zhu et al. |
| 2006/0163355 A1 | | 7/2006 | Olmstead et al. |
| 2006/0202036 A1 | | 9/2006 | Wang et al. |
| 2006/0278708 A1 | | 12/2006 | Olmstead |
| 2007/0201009 A1 | | 8/2007 | Suzuki et al. |
| 2007/0278309 A1 * | | 12/2007 | Knowles et al. ......... 235/462.25 |
| 2007/0297021 A1 | | 12/2007 | Smith |
| 2008/0017715 A1 | | 1/2008 | Knowles et al. |
| 2008/0017716 A1 | | 1/2008 | Knowles et al. |
| 2008/0023558 A1 | | 1/2008 | Knowles et al. |
| 2008/0029605 A1 | | 2/2008 | Knowles et al. |
| 2008/0041954 A1 | | 2/2008 | Gannon et al. |
| 2008/0110992 A1 | | 5/2008 | Knowles et al. |
| 2008/0110994 A1 | | 5/2008 | Knowles et al. |
| 2008/0128509 A1 | | 6/2008 | Knowles et al. |
| 2008/0135619 A1 | | 6/2008 | Kwan |
| 2008/0142596 A1 | | 6/2008 | Knowles et al. |
| 2008/0217201 A1 | | 9/2008 | Keller et al. |
| 2009/0001166 A1 | | 1/2009 | Barkan et al. |
| 2009/0020612 A1 | | 1/2009 | Drzymala et al. |
| 2009/0084847 A1 | | 4/2009 | He et al. |
| 2009/0084854 A1 * | | 4/2009 | Carlson et al. ........... 235/462.41 |
| 2009/0206161 A1 | | 8/2009 | Olmstead |
| 2010/0001075 A1 * | | 1/2010 | Barkan ..................... 235/462.41 |
| 2010/0051695 A1 * | | 3/2010 | Yepez et al. .............. 235/462.32 |
| 2010/0147953 A1 * | | 6/2010 | Barkan ..................... 235/462.41 |
| 2010/0163622 A1 * | | 7/2010 | Olmstead ....................... 235/454 |
| 2010/0163626 A1 | | 7/2010 | Olmstead |
| 2010/0163627 A1 * | | 7/2010 | Olmstead ....................... 235/470 |
| 2010/0163628 A1 * | | 7/2010 | Olmstead ....................... 235/470 |
| 2010/0165160 A1 | | 7/2010 | Olmstead et al. |
| 2010/0219249 A1 | | 9/2010 | Barkan et al. |
| 2010/0252633 A1 * | | 10/2010 | Barkan et al. ............ 235/462.24 |
| 2011/0127333 A1 * | | 6/2011 | Veksland et al. ......... 235/462.24 |

FOREIGN PATENT DOCUMENTS

| | | |
|---|---|---|
| CN | 1511298 A | 7/2004 |
| EP | 1020810 | 7/2000 |
| EP | 1380983 | 1/2004 |
| EP | 1223535 A2 | 6/2006 |
| EP | 1933254 | 6/2008 |
| JP | 4251992 A | 9/1992 |
| JP | 07-168905 | 7/1995 |
| JP | 2005521164 | 7/2005 |
| JP | 2007-521575 A | 8/2007 |
| KR | 10-2001/0005875 A | 1/2001 |
| WO | WO 98/44330 | 10/1998 |
| WO | WO 2006/062818 A2 | 7/2002 |
| WO | WO 03/081521 A1 | 10/2003 |
| WO | WO 2007/149876 | 12/2007 |

OTHER PUBLICATIONS

European Search Report dated Feb. 15, 2010 for European Application No. 07798775.8.

Srinivasan, "A New Class of Mirrors for Wide-Angle Imaging," Centre for Visual Sciences, Research School of Biological Sciences, Australian National University, (date unknown, but circa 2000).

International Search Report and Written Opinion for PCT Patent Application No. PCT/US2009/033237, issued Jul. 31, 2009.

International Search Report and Written Opinion for PCT Patent Application No. PCT/US2009/069536, issued Jul. 30, 2010.

International Search Report and Written Opinion for PCT Patent Application No. PCT/US2009/069537, issued Jul. 30, 2010.

International Search Report and Written Opinion for PCT Patent Application No. PCT/US2009/069530, issued Aug. 16, 2010.

Website—http://www.e2v.com/news/e2v-introduces-new-high-spec-1-3mp-cmo.......

Website—http://www.e2v.com/news/e2v-introduces-new-high-spec-1-3mp-cmos-image-sensor—with-embedded-features—for-industrial-imaging-/ (Sep. 14, 2009).

"Enhanced Laser Shutter Using a Hard Disk Drive Rotary Voice-Coil Actuator," http://rsi.aip.org/resource/1/rsinak/v78/i2/p026101_s1?isAuthorized=no See also http://scitation.aip.org/getabs/servelt/GetabsServlet?prog=normal&id=RSINAK00 . . . , published Feb. 9, 2007.

International Search Report and Written Opinion, PCT/US/2009/068680, Aug. 17, 2010.

Putting the "world" in Wincor World, http://www.retailcustomerexperience.com/article/4371/Putting-the-world-in-Wincor-World, visited Sep. 15, 2011, 3 pages.

Wincor World: 360-degree scanning will speed check-out, http://www.retailcustomerexperience.com/article/4374/WINCOR-WORLD-360-degree-scanning-will-speed-check-out, visited Aug. 24, 2011, 1 page.

Wincor World focuses on service, automated checkout, http://www.retailcustomerexperience.com/article/3626/Wincor-World-focuses-on-service-automated-checkout?rc_id=16, visited Sep. 15, 2011, 3 pages.

Why Retailers Invest in Self-Service in 2009, http://www.kioskeurope.com/print/1726, visited Sep. 15, 2011, 3 pages.

Office Action dated Jun. 15, 2012 from European Patent Office application No. EP 09 835 882.3 (corresponding to the present application) seven pages, downloaded Jun. 18, 2012.

\* cited by examiner

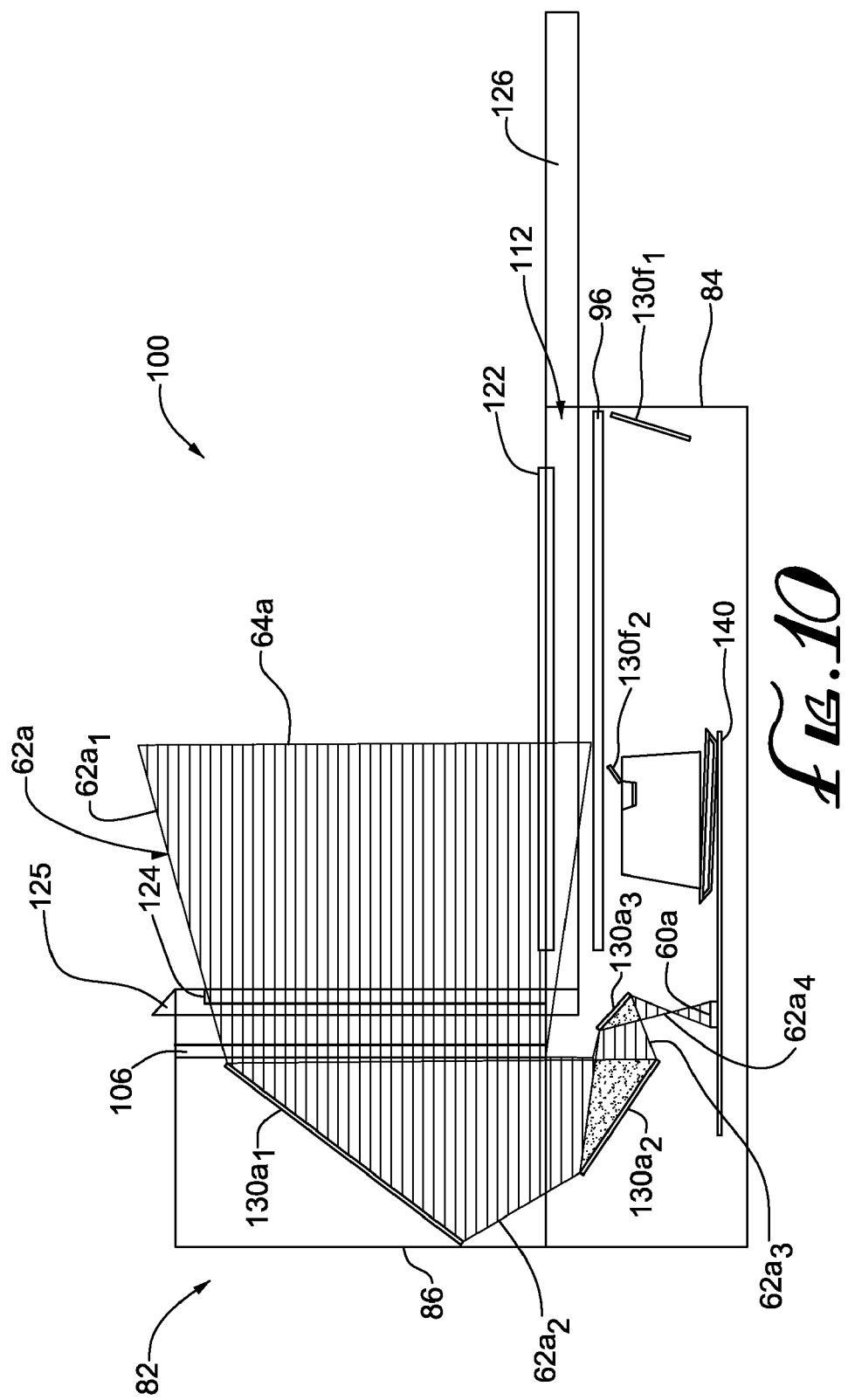

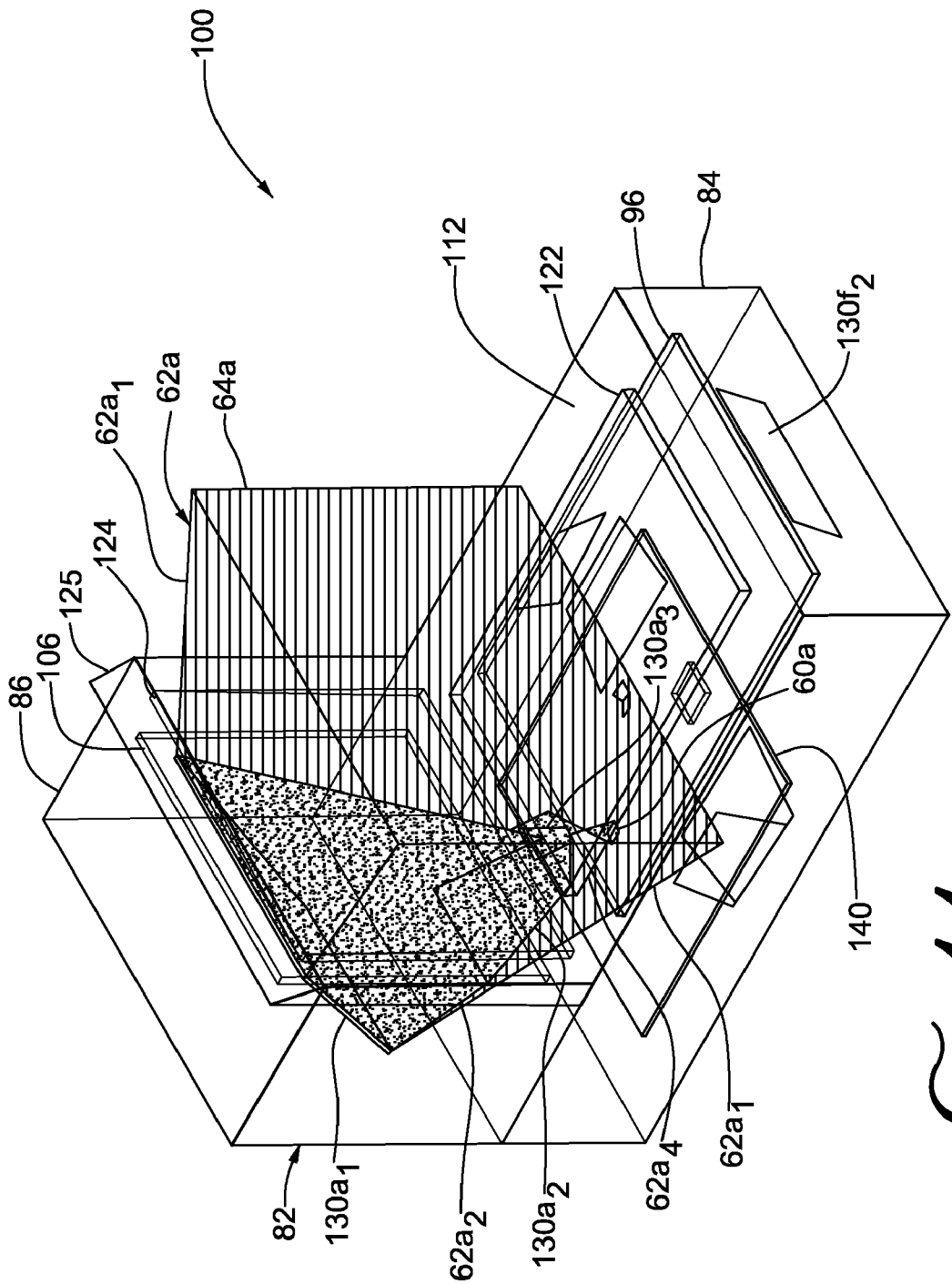

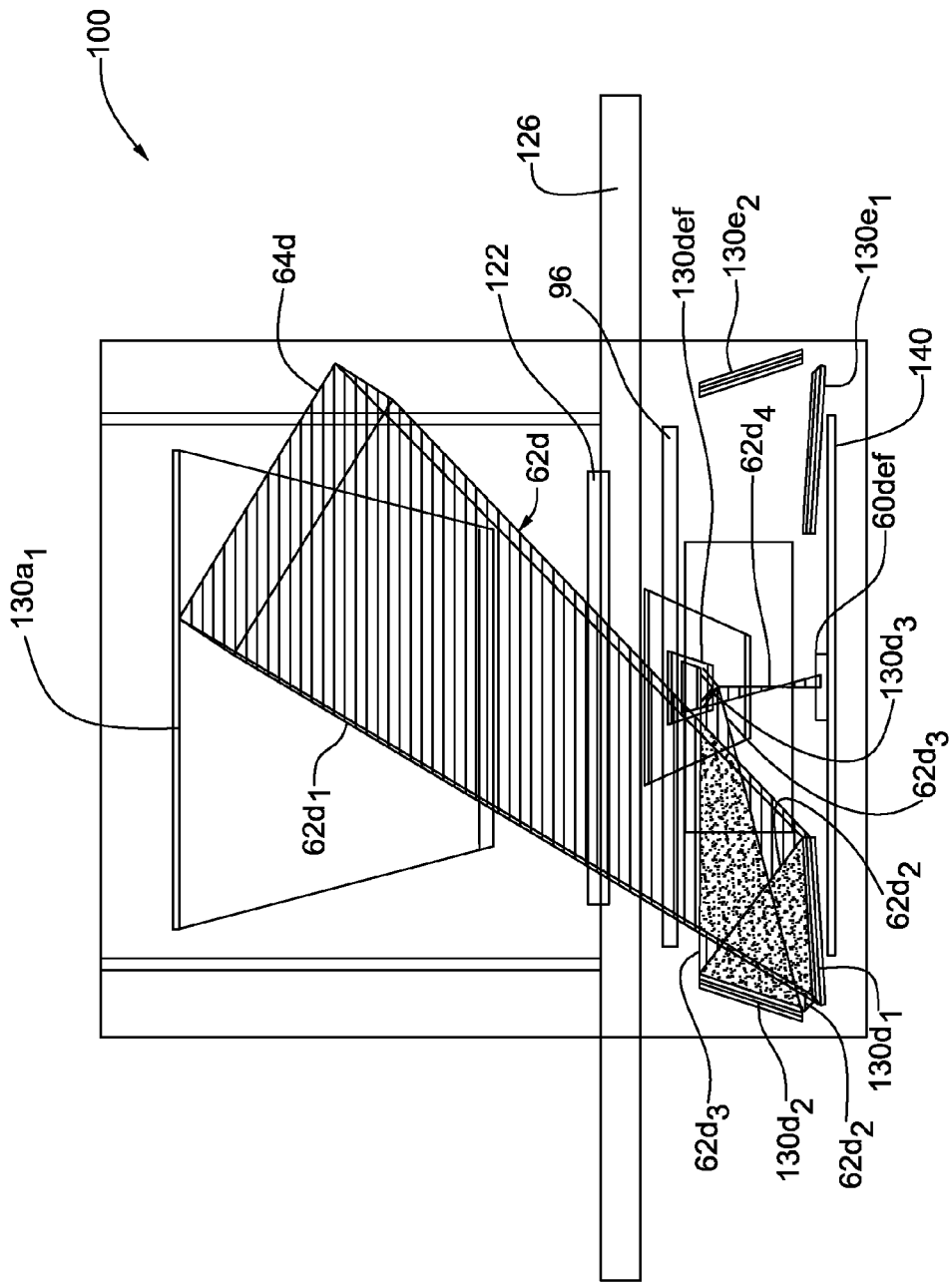

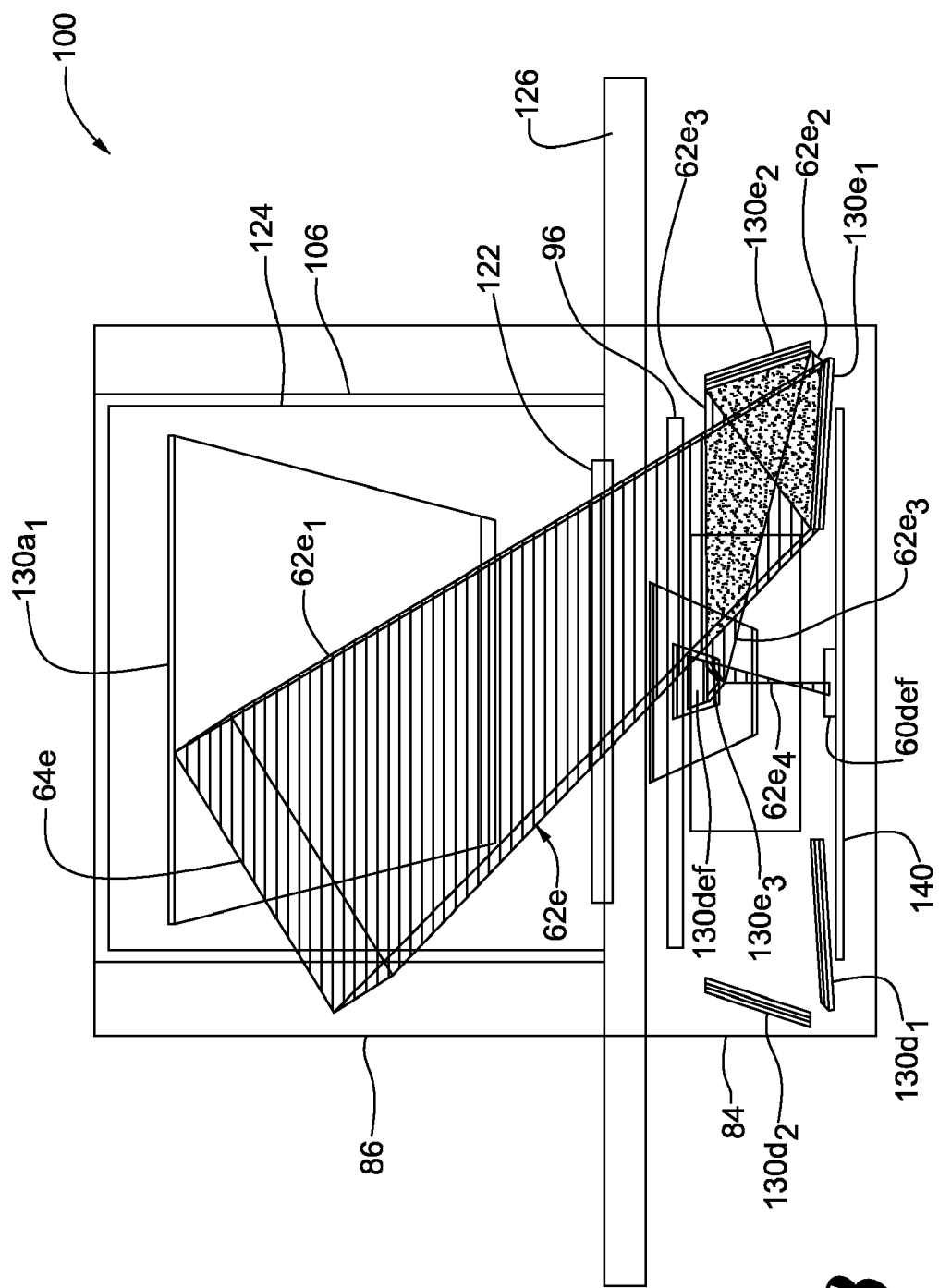

DATA READER HAVING COMPACT ARRANGEMENT FOR ACQUISITION OF MULTIPLE VIEWS OF AN OBJECT

RELATED APPLICATION DATA

This application claims priority under 35 U.S.C. 119(e) to U.S. Provisional Patent Application No. 61/140,930 filed Dec. 26, 2008, hereby incorporated by reference.

This application is also related to: U.S. application Ser. No. 12/646,829, filed Dec. 23, 2009 entitled "Two-Plane Optical code Reader for Acquisition of Multiple Views of an Object"; U.S. application Ser. No. 12/646,755, filed Dec. 23, 2009 entitled "Image-Based Code Reader for Acquisition of Multiple Views of an Object and methods for Employing Same"; and U.S. application Ser. No. 12/646,794, filed Dec. 23, 2009 entitled "Monolithic Mirror Structure For Use in a Multi-Perspective Optical Code Reader", each of these applications hereby incorporated by reference.

BACKGROUND

The field of the present disclosure relates generally to imaging, and more particularly but not exclusively to reading of optical codes such as, for example, bar codes.

Optical codes encode useful, optically-readable information about the items to which they are attached or otherwise associated. Perhaps the best example of an optical code is the bar code. Bar codes are ubiquitously found on or associated with objects of various types, such as the packaging of retail, wholesale, and inventory goods; retail product presentation fixtures (e.g., shelves); goods undergoing manufacturing; personal or company assets; documents; and document files. By encoding information, a bar code typically serves as an identifier of an object, whether the identification be to a class of objects (e.g., containers of milk) or a unique item (e.g., U.S. Pat. No. 7,201,322).

Bar codes include alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader must be able to reliably discern the pattern of bars and spaces, such as by determining the locations of edges demarking adjacent bars and spaces from one another, across the entire length of the bar code.

Bar codes are just one example of the many types of optical codes in use today. The most common bar codes are one-dimensional or linear optical codes, such as the UPC code or Code 39 bar code, where the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as "bar codes," are also used for various purposes.

An imager-based reader utilizes a camera or imager to generate electronic image data (typically in digital form) of an optical code. The image data is then processed to find and decode the optical code. For example, virtual scan line techniques are known techniques for digitally processing an image containing an optical code by looking across an image along a plurality of lines, typically spaced apart and at various angles, somewhat similar to the scan pattern of a laser beam in a laser-based scanner.

Imager-based readers often can only form images from one perspective—usually that of a normal vector out of the face of the imager. Such imager-based readers therefore provide only a single point of view, which may limit the ability of the reader to recognize an optical code in certain circumstances. For example, because the scan or view volume of an imager in an imager-based reader is typically conical in shape, attempting to read a barcode or other image in close proximity to the scanning window (reading "on the window") may be less effective than with a basket-type laser scanner. Also, when labels are oriented such that the illumination source is reflected directly into the imager, the imager may fail to read properly due to uniform reflection washing out the desired image entirely, or the imager may fail to read properly due to reflection from a textured specular surface washing out one or more elements. This effect may cause reading of shiny labels to be problematic at particular reflective angles. In addition, labels oriented at extreme acute angles relative to the imager may not be readable. Lastly, the label may be oriented on the opposite side of the package with respect to the camera view, causing the package to obstruct the camera from viewing the barcode.

Thus, better performance could result from taking images from multiple perspectives. A few imager-based readers that generate multiple perspectives are known. One such reader is disclosed in the present assignee's Olmstead et al. U.S. Pat. No. 7,398,927 which discloses an embodiment having two cameras to collect two images from two different perspectives for the purpose of mitigating specular reflection. U.S. Pat. No. 6,899,272 discloses one embodiment that utilizes two independent sensor arrays pointed in different orthogonal directions to collect image data from different sides of a package. Unfortunately, multiple-camera imager-based readers that employ spatially separated cameras require multiple circuit boards and/or mounting hardware and space for associated optical components which can increase the expense of the reader, complicate the physical design, and increase the size of the reader. Another embodiment according to the '272 patent utilizes a single camera pointed at a moveable mirror that can switch between two positions to select one of two different imaging directions. Additionally, the present assignee's Olmstead et al. U.S. Pat. No. 5,814,803 depicts in its FIG. 62 what may be described as a kaleidoscope tunnel formed from two mirrored surfaces, resulting in eight different, rotated versions of the same barcode from an object on a single imager.

The applicant has, therefore, determined that it would be desirable to provide an imager-based reader that improves on the limitations of existing imager-based readers.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which:

FIG. 10 is a side view and FIG. 11 is an isometric view of the optical reader of FIGS. 6-9, these views illustrating mirrors reflecting an upper perspective of a view volume along an image path to an imager the image path and view volume being shown with shading lines.

FIG. 14 is a front view and FIG. 15 is an isometric view of the optical reader of FIGS. 6-9, the views illustrating mirrors reflecting a left lower perspective of a view volume along an image path to an imager, the image path and view volume being shown with shading lines.

FIG. 18 is a front view and FIG. 19 is an isometric view of the optical reader of FIGS. 6-9, the views illustrating mirrors reflecting a right lower perspective of a view volume along an image path to an imager, the image path and view volume being shown with shading lines.

DETAILED DESCRIPTION OF EMBODIMENTS

With reference to the above-listed drawings, this section describes particular embodiments and their detailed construction and operation. The embodiments described herein are set forth by way of illustration only and not limitation. It should be recognized in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Various imager-based optical code readers and associated methods are described herein. Some embodiments of these optical code readers and systems improve the performance of optical code readers by providing multiple image fields to capture multiple views.

In some embodiments, an image field of an imager may be partitioned into two or more regions, each of which may be used to capture a separate view of the view volume. In addition to providing more views than imagers, such embodiments may enhance the effective view volume beyond the view volume available to a single imager having a single point of view.

A most successful high-volume bar code reader currently available is a laser-based scanner having a multiple window or bioptic configuration such as the Magellan® scanner available from Datalogic Scanning, Inc. of Eugene, Oreg. Retail establishments such as grocery stores require such a high-volume and fast scanners. Thus checkout lanes, both checker-assisted and self-checkout, are currently configured to accommodate a bioptic scanner.

Figure 1:
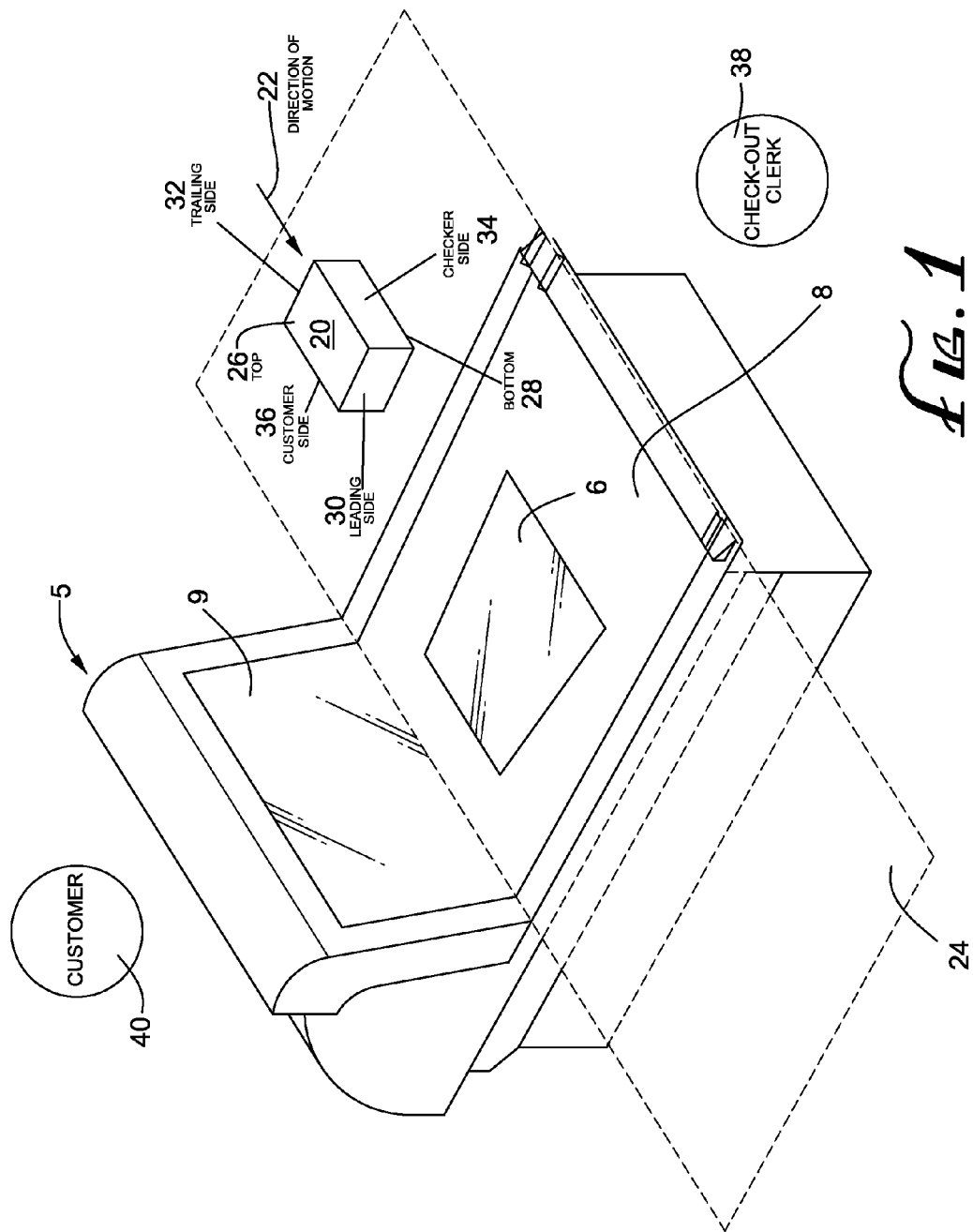
FIG. 1 is an illustration of an exemplary six-sided box-shaped object that may be passed through a view volume of an optical code reader.

FIG. 1 is an illustration of an exemplary object 20 that may be passed through a view volume of an optical code reader 5, in this instance a multiple aperture reader 5 having a lower or horizontal window 6 and an upper or vertical window 9. The windows 6, 9 (and the upper and lower housing sections) are generally transverse to each other, forming a generally L-shaped structure. The upper window 9 and lower window 6 are preferably portions of a two-plane weigh scale platter 8 such as the All-Weighs® platter available from Datalogic Scanning, Inc. of Eugene, Oreg. The view volume may be a function of the enclosure and style of the optical code reader and the perspectives of the views in which images of the objects are captured. A perspective may encompass a location, direction, angle, or any combination of the foregoing, or the like, that characterize a vantage or point of view for seeing, imaging, visualizing via machine vision, or illuminating the object 20 or a part of the object 20.

For general purposes of discussion, the object 20 is represented by a rectangular shaped six-sided polyhedron, such as a cereal box (hereinafter referred to as a box-shaped item or object) that may be passed through a scan region of a data reader, such as for example a data reader 5 installed in a checkout stand 24 at a retail store (e.g., a supermarket). As to the description of the following embodiments, it should be understood that certain capabilities of the data reader will be described with respect to reading sides of the box-shaped object 20 and that a checkout stand is an exemplary use for the optical code readers discussed herein and should not be considered as limiting.

For convenience, referring to FIG. 1, this box-shaped object 20 may be described with respect to its direction of travel 22 across a surface of the platter 8. For the purposes of description relative to the ability of an optical code reader 5 to read certain of the sides of the box-shaped object 20 being passed through the scan volume defined between the windows 6, 9, in the orientation as illustrated, the box-shaped object may be described as having a top side 26, a bottom side 28, and four lateral sides 30, 32, 34, and 36. The lateral sides may be referred to as the leading (or left lateral) side 30 (the side leading the object as it is passed through the read region), the trailing (or right lateral) side 32 (the trailing side of the object as it is passed through the read region), the checker (or front lateral) side 34 (due to its proximity to a checkout clerk 38), and the customer (or rear lateral) side 36 (due to its proximity to a customer 40). A housing or the vertical housing portion of an optical code reader 5 may separate the customer 40 from the object 20 if the optical code reader is a vertical optical code reader or a bi-optic optical code reader. The customer side 36 may alternatively be described as a wall side 36 or a side oriented generally vertically facing the vertical window 9. The checker side 34 may alternatively be described as facing opposite the customer side 36.

FIGS. 2 through 5 are illustrations of imagers 60 (60a, 60b, 60c, 60d, 60e, and 600, such as included in cameras, positioned to capture direct perspective views of all sides of the object 20. A camera includes an imager and lens, thus cameras are shown in FIGS. 2-5 as imagers 60 and lenses 70. The perspective views form respective view volumes portions 64a, 64b, 64c, 64d, 64e, and 64f, some or all of which may intersect in proximity to the object 20. Images of the object 20 propagate along corresponding image paths 62 (62a, 62b, 62c, 62d, 62e, 620 that correspond to the perspective views and are captured by corresponding imagers 60a, 60b, 60c, 60*d*, 60*e*, and 60*f*. It is noted that the figures only show portions of the view volumes, and are not intended to represent either the near field or far field extent of the view volumes.

Respective lenses 70 (70*a*, 70*b*, 70*c*, 70*d*, 70*e* and 70*f*) are appropriately positioned at or in proximity to the imagers 60 along the associated image paths 62, a respective lens system and imager working in concert to a field of view or scan/view volume. For ease of understanding, the imagers 60 are depicted capturing the direct perspectives through at least two viewing windows positioned in transverse planes, typically a lower viewing window 6 and an upper viewing window 9. In some preferred embodiments, the lower viewing window 6 and the upper viewing window 9 are positioned in orthogonal planes with the lower window being oriented in a horizontal plane and the upper window being oriented in a vertical plane. In some embodiments, the lower viewing window 6 and the upper viewing window 9 may be transparent plates that may be separated or adjoining. In other configurations, the lower window may be divided into multiple windows.

Figure 2:
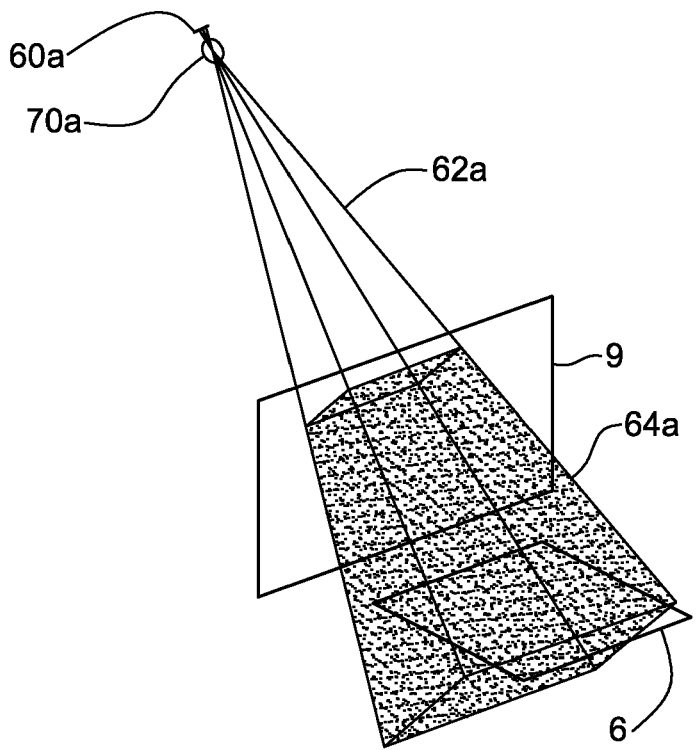
FIGS. 2, 3, 4 and 5 are illustrations of cameras positioned to capture direct perspectives looking into a view volume.

FIG. 2 illustrates a top imager 60*a* capturing a top perspective of the view volume portion 64*a* along a top image path 62*a* through the upper viewing window 9. The top perspective may facilitate capture of images of the customer side 36 as well as the top side 26 of the object 20. The top perspective may also facilitate the capture of images of either the leading side 30 or the trailing side 32 depending on the location of the imager 60*a* and the orientation of the plane of its imaging field.

Figure 3:
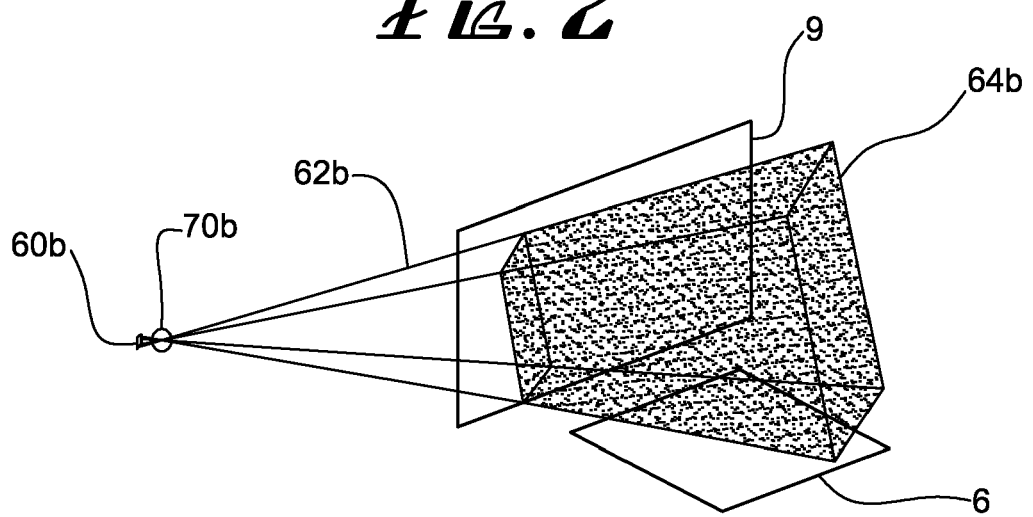

FIG. 3 illustrates a left vertical imager 60*b* capturing a left vertical perspective of the view volume portion 64*b* along a left vertical image path 62*b* through the upper viewing window 68. The left vertical perspective may facilitate capture of images of the leading side 30 as well as the customer side 36. The left vertical perspective may also facilitate capture of an image of the top side 26 of the object 20 depending on the height of the imager 60*b* and the orientation of the plane of its imaging field.

Figure 4:
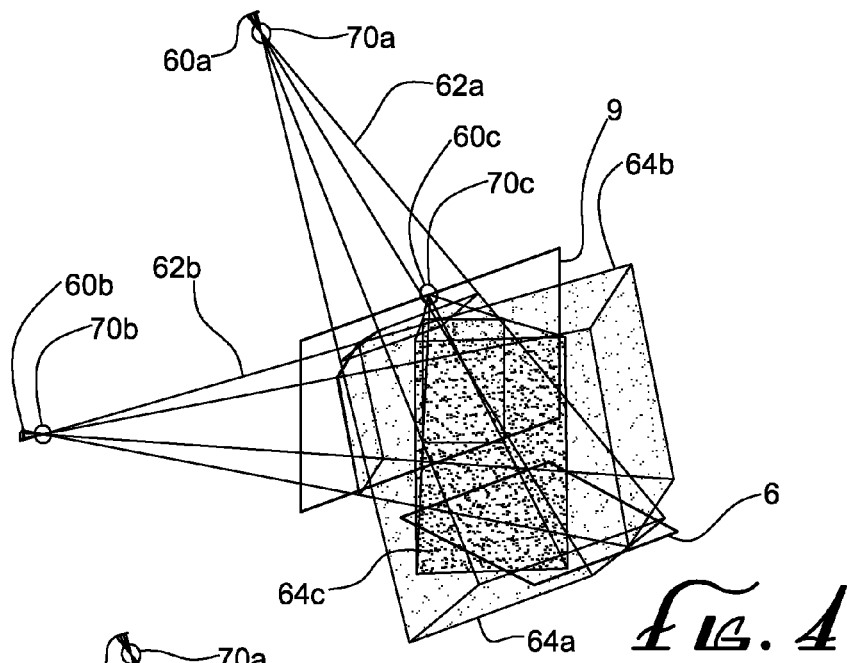

FIG. 4 illustrates the top imager 60*a* of FIG. 2, the left vertical imager 60*b* of FIG. 3, and a right vertical imager 60*c* capturing a right vertical perspective of the view volume portion 64*c* along a right vertical image path 62*c* through the upper viewing window 9. The right vertical perspective may facilitate capture of images of the trailing side 32 as well as the customer side 36. The right vertical perspective may also facilitate capture of an image of the top side 26 of the object 20 depending on the height of the imager 60*c* and the orientation of the plane of its imaging field.

Figure 5:
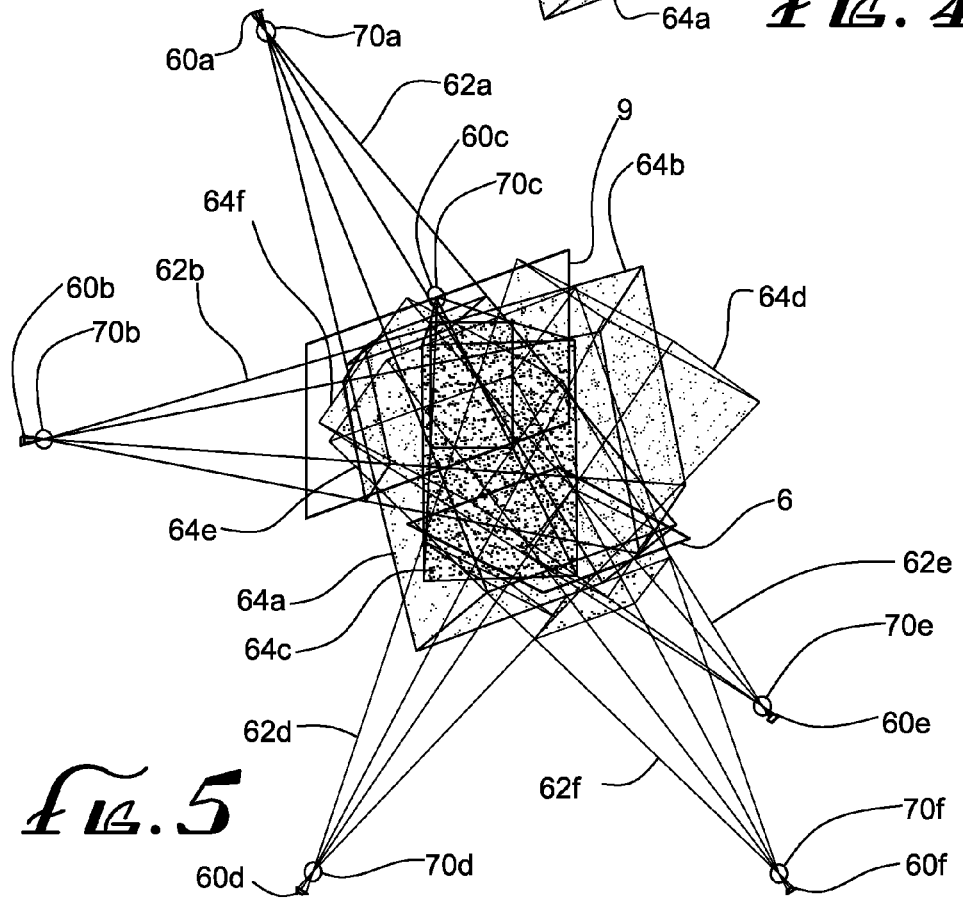

FIG. 5 illustrates the imagers 60*a-c* of FIG. 4 reading through the upper window 9, but also shows a left horizontal imager 60*d*, a right horizontal imager 60*e*, and a back imager 60*f* capturing respectively a left horizontal perspective, a right horizontal perspective, and a back perspective of the respective view volumes portions 64*d*, 64*e*, and 64*f* along respective image paths 62*d*, 62*e*, and 62*f* through the lower viewing window 6. The left horizontal perspective may facilitate capture of images of the leading side 30 as well as the bottom side 28. The left horizontal perspective may also facilitate capture of an image of either the checker side 34 or the customer side 36 depending on the location of the imager 60*d* and the orientation of the plane of its imaging field. The right horizontal perspective may facilitate capture of images of the trailing side 32 as well as the bottom side 28. The right horizontal perspective may also facilitate capture of an image of the customer side 36 of the object 20 depending on the location of the imager 60*e* and the orientation of the plane of its imaging field. The back perspective may facilitate capture of images of the checker side 34 as well as the bottom side 36.

With reference again to FIGS. 2 through 5, an optical code reader employing a plurality of imagers 60*a-f*, each for capturing a different direct perspective view of the view volume 64, may provide excellent performance in terms of a first pass read rate (FPRR) regardless of the placement or orientation of the object 20 relative to such an optical code reader housing the imagers 60. Disadvantageously, the direct perspective imagers 60 may be relatively far away from the object 20, requiring such an optical code reader to have an optical reader housing of an impractically large size.

Accordingly, some embodiments employ a plurality of imagers 60 with respective sets of fold mirrors. The fold mirrors permit the imagers 60 to be closer to each other, and their associated viewing windows, and permit an optical reader housing to confine them to a smaller housing volume or capacity. Depending on the particular configuration, the imagers 60 may capture perspectives through a common viewing window and may be arranged in a portion of an optical code reader housing that is adjacent to the common viewing window. The reader may include a single viewing window or may have at least two transverse oriented viewing windows. In other configurations, the imagers 60 may be arranged in a portion of an optical code reader housing that is distant from, and/or generally transverse to, a common viewing window. In some embodiments including transversely oriented viewing windows, the imagers 60, regardless of which of the viewing windows they use to capture perspectives, may be arranged in a common portion of an optical code reader housing. In some of such embodiments, the imagers 60 may be in close proximity, may be supported along a common plane, or may be supported by or otherwise arranged/mounted on a common circuit board.

In alternative embodiments, a plurality of sets of fold mirrors can be employed to convey at least a portion of at least two different perspectives of the view volume to different regions of an image field of a common imager. In some of such embodiments, the sets of fold mirrors convey perspectives from a common viewing window onto different regions of an image field of a common imager. The imager may be located in a portion of an optical code reader housing that is adjacent to the common viewing window or located in a portion of an optical code reader housing that is distant from and/or generally transverse to the common viewing window, such as through orthogonal windows of an L-shaped bioptic optical code reader. In some configurations including transversely oriented viewing windows, different regions of an image field of a common imager may capture at least one perspective through each of the viewing windows.

Though described primarily with respect to a checker-assisted data reader, the readers and methods described herein may be employed in a self-checkout system. The optical readers described herein may be employed in an automatic reader, such as a tunnel scanner employing multiple housing portions that obtain multiple perspectives through multiple viewing windows.

Certain embodiments may be capable of achieving certain advantages, including some or all of the following: (1) perspective diversity, including the ability to robustly capture codes at a variety of locations and angular orientations (pitch, roll, and yaw) in the view volume, with concomitant advantages in terms of (a) improved usability, (b) improved FPRR rate, and (c) improved throughput for repeat-use applications such as retail checkout; (2) use of a single circuit board to mount multiple cameras; (3) improved utilization of space, resulting in a smaller reader. These and other advantages of various embodiments will be apparent in view of the disclosure that follows.

Additional details concerning the construction and operation of particular embodiments are set forth in the following subsections with reference to the above-listed drawings.

FIGS. 6 through 9 and 10 through 18 illustrate an optical code reader 100 according to an embodiment. It is noted that any reference numeral representing an element in one figure represents the same element in any of the other figures.

FIGS. 6 through 9 are respective side, isometric, front, and top views of the optical code reader 100 capable of capturing multiple views of an object (such as item 20 from FIG. 1) from different perspectives. The reader 100 comprises a housing with a lower housing section 84 and an upper housing section 86 joined to form an L-shaped structure. Preferably the reader 100 also includes a weigh scale, shown as a weigh platter 112 having a horizontal section 111 containing window/aperture 122 and a vertical section 125 containing a vertical or upper window/aperture 124. Details of such a two-plane platter are described in U.S. Pat. No. RE 40,071, which is herein incorporated by reference. In certain of the figures, the reader 100 is shown with an (optional) extended weigh platter section 126 of greater horizontal extent, but in other figures, the extended weigh platter is not illustrated so as not to obscure components of the optical reader 100. The optical reader is typically installed within a checkout counter such that the horizontal weigh platter 111/126 is level with the surface of the checkout counter.

With reference to FIGS. 6 through 9, the optical code reader 100 employs two imagers 60a and 60def disposed in the lower housing section 84 and mounted on a common printed circuit board 140. The upper view imager 60a captures a view through the upper window 124 and the lower imager 60def captures three views through the lower window 122. A second upper window 106 is disposed on the upper housing section 86 sealing off the internal components. Similarly, a second lower window 96 is disposed on the lower housing section 84 to seal off the internal components therein. These internal windows 106, 96 may also permit the platter 112 to be removable without exposing internal components. Detailed description of the mirrors and other components will be described in the following in conjunction with the other figures.

Figure 6:
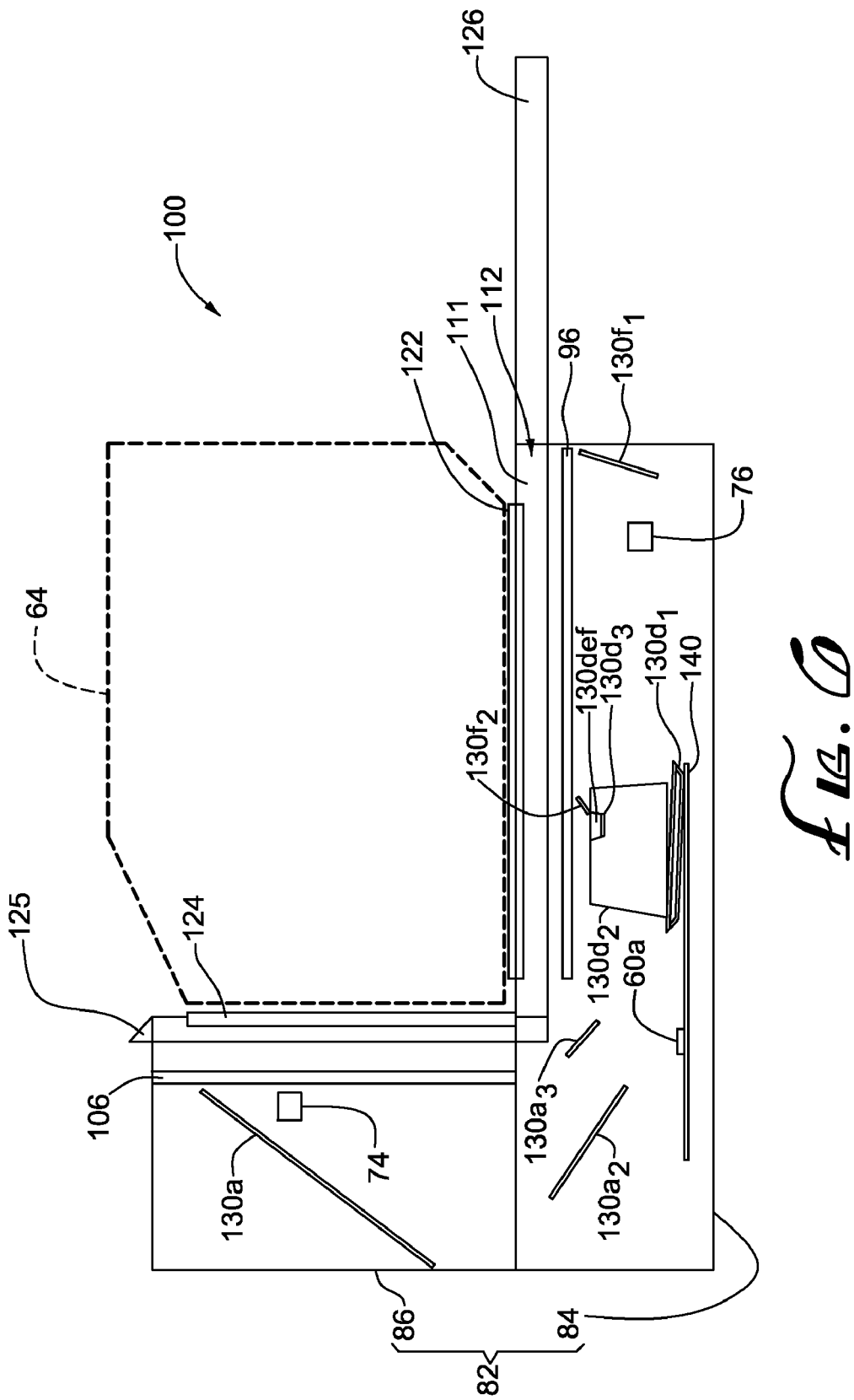
FIGS. 6, 7, 8 and 9 are respective side, isometric, front, and top views of an optical code reader capable of capturing multiple views from different perspectives according to a first embodiment.
Figure 7:
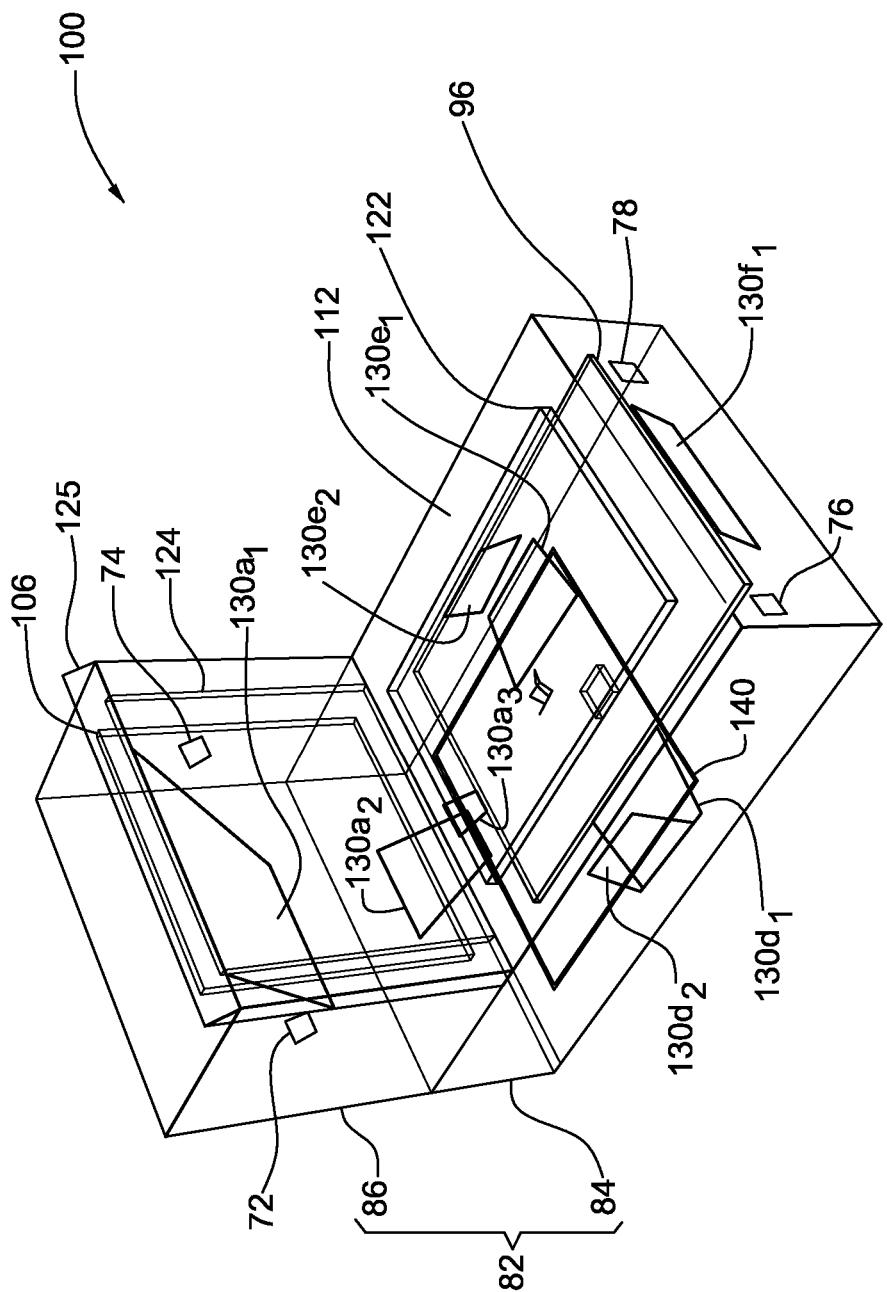
Figure 8:
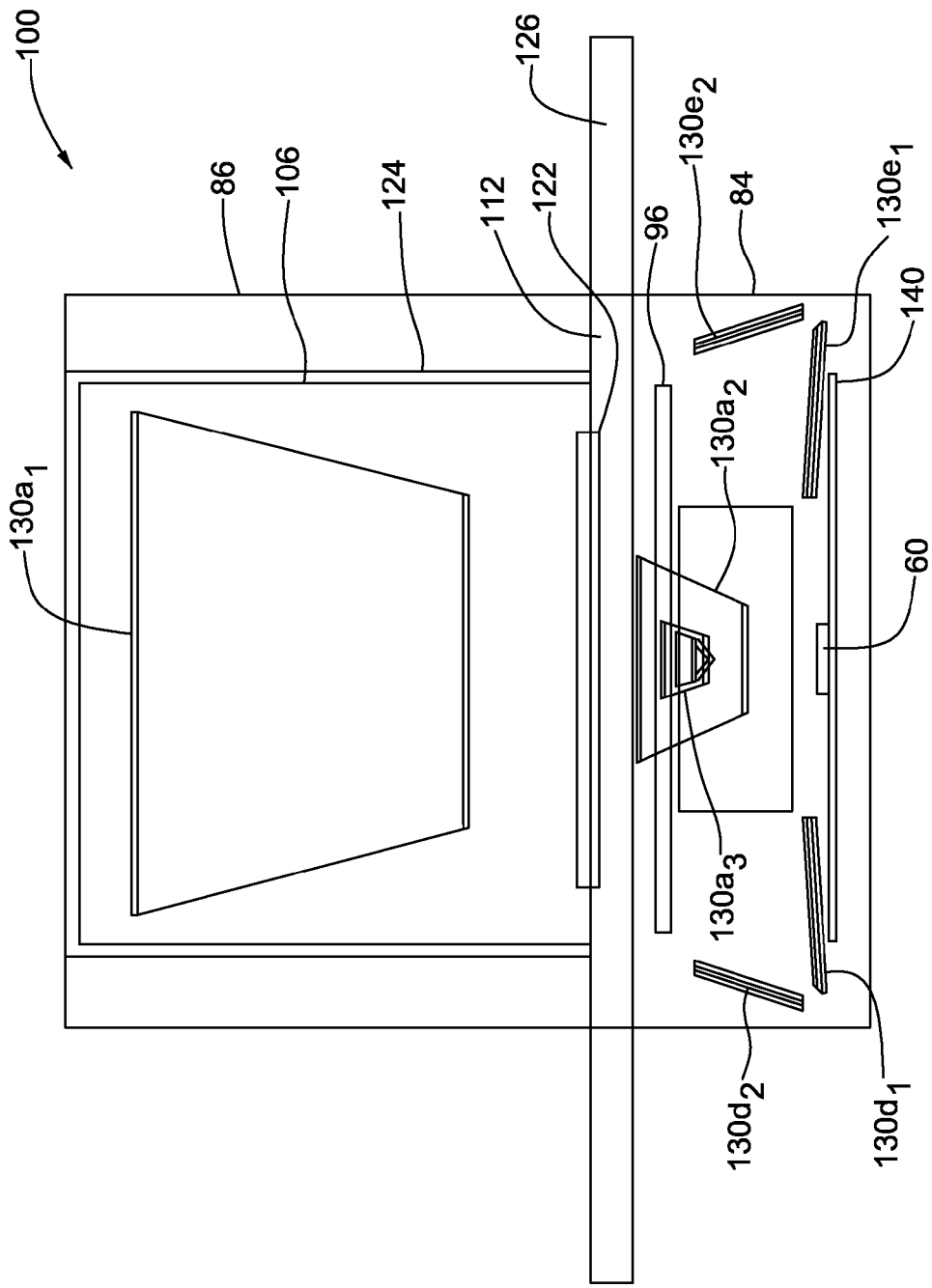
Figure 9:
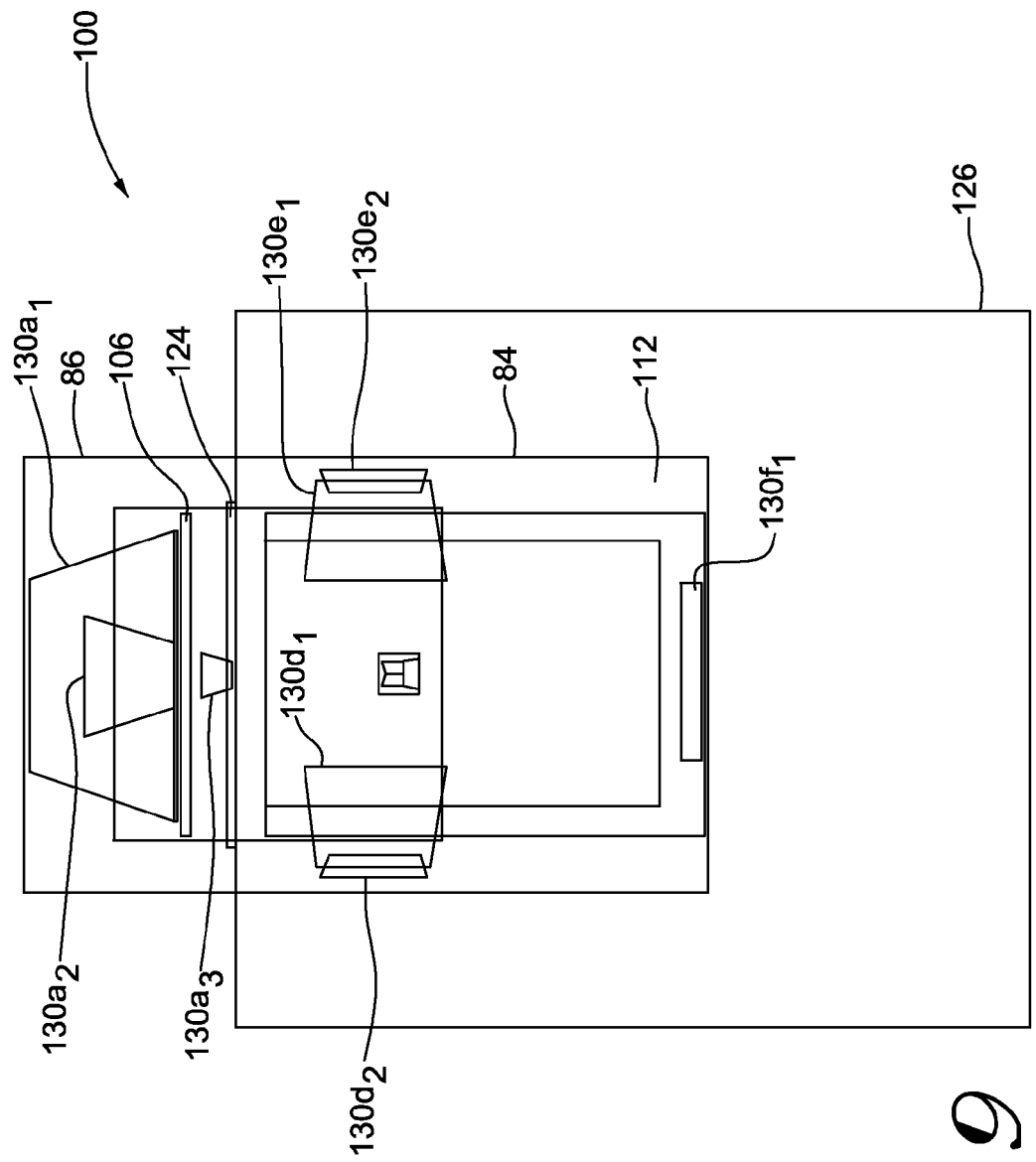

For purposes of description, FIG. 6 is illustrated with a view volume 64 shown in dashed lines. In the example of an optical reader, the view volume may be referred to as the scan volume or scan region, the scan region being a 3D volume of space in which there is a high probability of a successful read of an optical code placed within that volume of space. It should be noted that the view volume 64 shown in the figure is not a precise representation of the volumetric region viewable through the windows 124 and 122 by which the reader 100 may be capable of reading objects placed therein. The view volume is typically bounded by the windows 122 and 124 and extending outwardly to a maximum distance within the depth of field of the reader. The view volumes in the other figures are illustrated and may be described in similar fashion.

FIGS. 10 and 11 are respective side and isometric views of mirrors $130a_1$, $130a_2$, and, $130a_3$ reflecting an upper perspective of a view volume portion 64a along the image path 62a to the imager 60a of the optical code reader 100, the image path 62a and the view volume portion 64a being illustrated with shading lines. An image of the object 20 in the view volume portion 64a being captured from the upper perspective and propagated through the upper window 124 and the upper transparent plate 106 along a first image path segment $62a_1$ is reflected downward by a primary mirror $130a_1$ along a second image path segment $62a_2$ to a secondary mirror $130a_2$ which reflects the image upward and/or sideward along a third image path segment $62a_3$ to a tertiary mirror $130a_3$ which reflects the image downward along a fourth image path segment $62a_4$ to the imager 60a that may be supported on the printed circuit board (PCB) 140 located in the lower housing portion 84 of the housing 82. The image may be focused by a suitable focusing lens positioned in front of the imager 60a. For purposes of description, a naming convention is used herein, whereby the primary mirror is the first reflection surface of the object image, the secondary mirror is the second reflection surface, and the tertiary mirror is the third reflection surface. Thus the image of the object reflects from the primary mirror, to the secondary mirror and then to the tertiary mirror.

The view volume 64 is shown by dashed lines in FIG. 10 and is the same as previously described with reference to FIG. 6 above. For purposes of description, FIGS. 10-11 illustrate the view volume portion 64a as being truncated, terminating at a planar location within a generally central position within the view volume 64. That planar location may be considered a focal plane 64a' (FIG. 10). The view volumes and view volume portions in the other figures are illustrated and may be described in similar fashion.

The perspective associated with the image path 62a in FIGS. 10-11 is shown to provide a more sidewardly angle particularly suitable for obtaining an image of the customer side 36 of the object 20 within the view volume portion 64a. Such a perspective may not be particularly effective in reading the top side 26 of the object 20. By locating the primary mirror $130a_1$ closer to the top wall of the upper housing section 86 and oriented in a more downwardly fashion, an image of the top side 26 of the item 20 may be more effectively acquired. Other upper window mirror configurations may be employed such as those disclosed in U.S. application Ser. No. 12/646,829, filed Dec. 23, 2009 and hereby incorporated by reference, for example, (1) a single reflecting mirror embodiment of FIG. 5F therein, or (2) a dual reflection—a multiple view embodiment of FIG. 3 therein.

Figure 13:
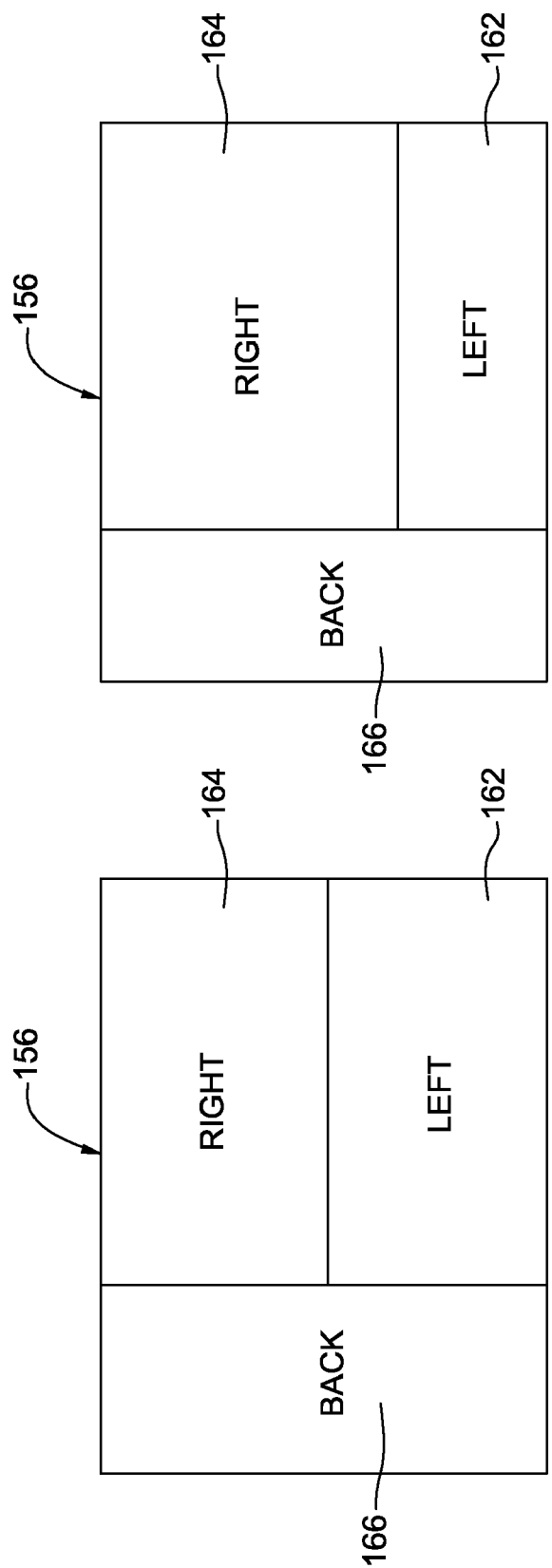
FIG. 13 is a top view of an image field of an imager divided into three alternative regions to capture separate views.
Figure 12:
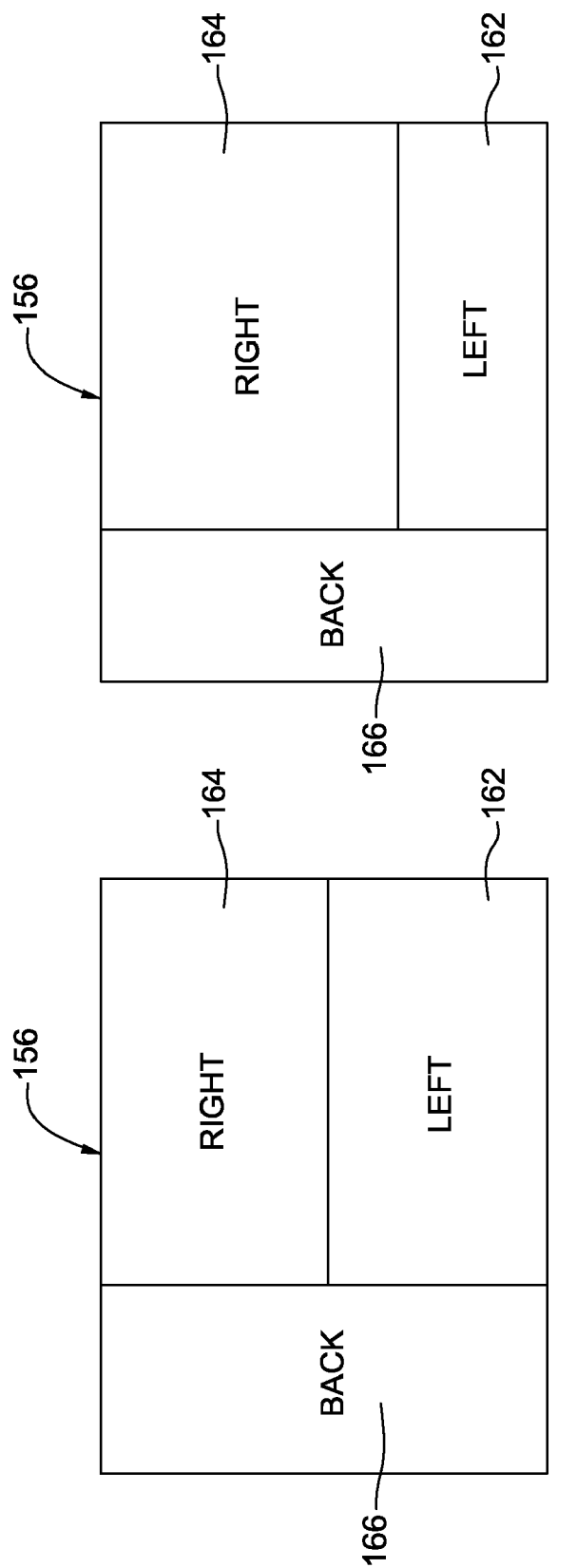
FIG. 12 is a top view of an image field of an imager divided into three regions to capture separate views.

FIG. 12 is a diagrammatic top view of an image field 156 of an imager 60def divided into three regions to capture separate views, and FIG. 13 shows an alternative division of the image field 156 into three alternative regions to capture the separate views of the lower reading section as will be described in the following. The image field includes a left side region 162, a right side region 164, and a back region 166.

Figure 15:
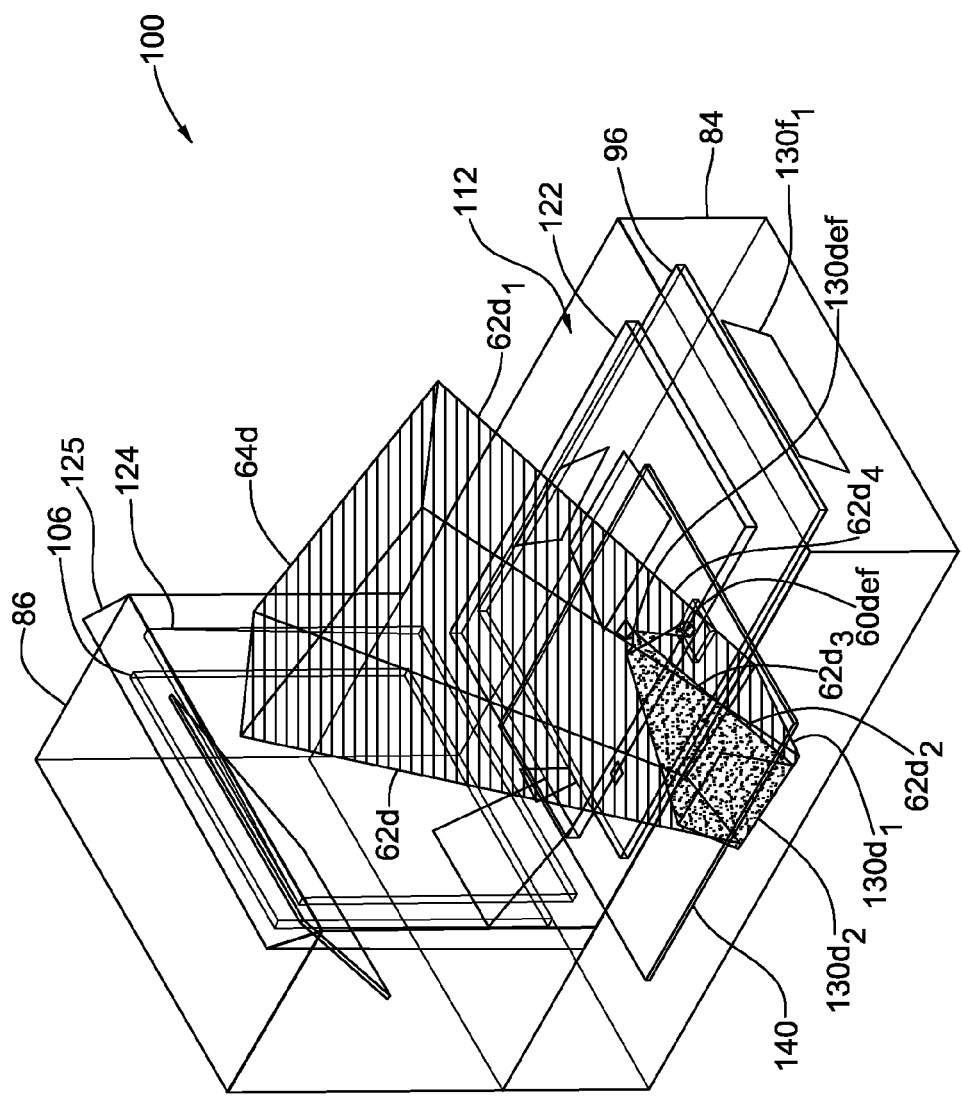

FIG. 14 is a front view and FIG. 15 is an isometric view of the optical reader 100 of FIGS. 6-9, the views illustrating mirrors reflecting a left lower perspective of a view volume portion 64d along an image path to the imager 60def, the image path 62d and view volume portion 64d being shown with shading lines. The image of the object 20 in the view volume portion 64d being captured from the left lower perspective and propagated through the lower window 122 and through the transparent plate 96 along a first image path segment $62d_1$ is reflected by a primary mirror $130d_1$ upwardly along a second image path segment $62d_2$ to a secondary mirror $130d_2$ which reflects the image sidewardly along a third image path segment $62d_3$ to a tertiary mirror 130def which reflects the image downwardly along a fourth image path segment $62d_4$ to the imager 60def that may be mounted on or supported on the PCB 140 located in the lower housing portion 84 of the housing 82. The image may be focused by a suitable focusing lens positioned in front of the imager 60def.

For purposes of description, FIGS. 14-15 illustrate the view volume portion 64d as being truncated, terminating at a planar location within the overall view volume 64 shown in FIG. 6. The overall view volume 64d from the window upward also generally illustrates the read region of best focus.

The upwardly and sidewardly direction of the image path 62d is particularly adept at obtaining an image of at the bottom side 28 and the leading side 30 of the object 20 being passed through the view volume portion 64d.

The mirrors $130d_1$ and $130d_2$ may be separated as shown, or they may be abutting, or they may be integrated into a single split mirror with or without nonreflective regions in proximity to their intersection. The tertiary mirror 130def is preferably an integrated (single piece) split or compound mirror that includes mirror components $130d_3$, $130e_3$, and $130f_2$ of the respective image paths 62d, 62e, and 62f. The mirror components $130d_3$, $130e_3$, and $130f_2$ of the split mirror configuration of the tertiary 130def may be arranged at different angles with respect to the horizontal or vertical planes (and with respect to each other) to accommodate the orientations of the different image paths 62d, 62e, and 62f. The mirror components $130d_3$, $130e_3$, and $130f_2$ may employ any of the variations used for any of the mirrors 130 as previously described.

The split mirror structure of tertiary mirror 130def may be formed by any suitable method such as by molding, bending, and/or welding a single substrate, such as a metal or plastic, and then applying a reflective coating. Any desired nonreflective regions could be covered in advance by masking or subsequently covered by a nonreflective coating. Alternatively, the split mirror 130def may be assembled from separate mirrored components. In some embodiments, the mirror components $130d_3$, $130e_3$, and $130f_2$ may have nonreflective regions in proximity to their intersections. In some embodiments, some image processing advantages may be gained by not capturing images reflected from near the intersection of the mirror components $130d_3$, $130e_3$, and $130f_2$ of the split mirror 130def. In some alternative embodiments, the mirror components $130d_3$, $130e_3$, and $130f_2$ may be separated into two or three separate mirrors. In some embodiments, the mirror components $130d_3$, $130e_3$, and $130f_2$ direct the respective image paths 62 to separate imagers 60 that may be closely spaced.

Figure 17:
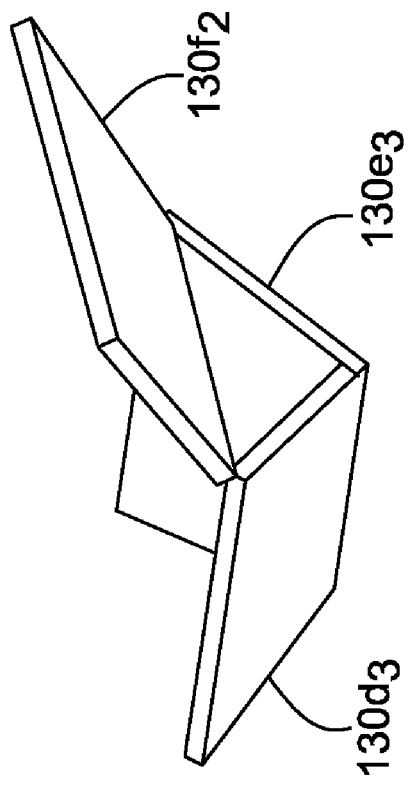
FIGS. 16 and 17 are an isometric views of different embodiments of the split mirror component for use with the optical reader of FIGS. 14-15.
Figure 16:
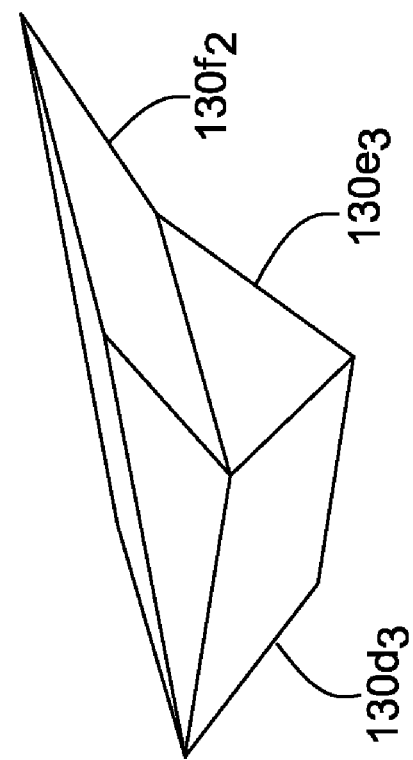

FIGS. 16 and 17 are an isometric views of different embodiments of the mirror 130def for use with the horizontal imager in the optical code reader 150. The mirror 130def is preferably an integrated, monolithic, or single-piece split mirror or compound mirror that includes mirror components $130d_3$, $130e_3$, and $130f_2$ of the respective image paths 62d, 62e, and 62f. The mirror components $130d_3$, $130e_3$, and $130f_2$ of the split mirror 130def may be arranged at different angles with respect to the horizontal or vertical planes (and with respect to each other) to accommodate the orientations of the different image paths 62d, 62e, and 62f. The mirror components $130d_3$, $130e_3$, and $130f_2$ may employ any of the variations used for any of the mirrors 130 as previously described. The mirror 130def may be formed by molding, bending, and/or welding a single monolithic piece or substrate, such as a metal or plastic, and then applying reflective coatings. Any desired nonreflective regions could be covered in advance by masking or subsequently covered by a nonreflective coating. Alternatively, the mirror 130def may be assembled from separate mirrored components. In some embodiments, the mirror components $130d_3$, $130e_3$, and $130f_2$ may have nonreflective regions in proximity to their intersections. In some embodiments, some image processing advantages may be gained by not capturing images reflected from near the intersection of the mirror components $130d_3$, $130e_3$, and $130f_2$ of the split mirror 130def. In some alternative embodiments, the mirror components $130d_3$, $130e_3$, and $130f_2$ may be separated into two or three separate mirrors. In some embodiments, the mirror components $130d_3$, $130e_3$, and $130f_2$ direct the respective image paths 62 to separate imagers that may be closely spaced. Details of other suitable split or compound mirror configurations are disclosed in U.S. application Ser. No. 12/646,794, filed Dec. 23, 2009; and in U.S. application Ser. No. 12/646,829, filed Dec. 23, 2009, both of which are hereby incorporated by reference.

Figure 19:
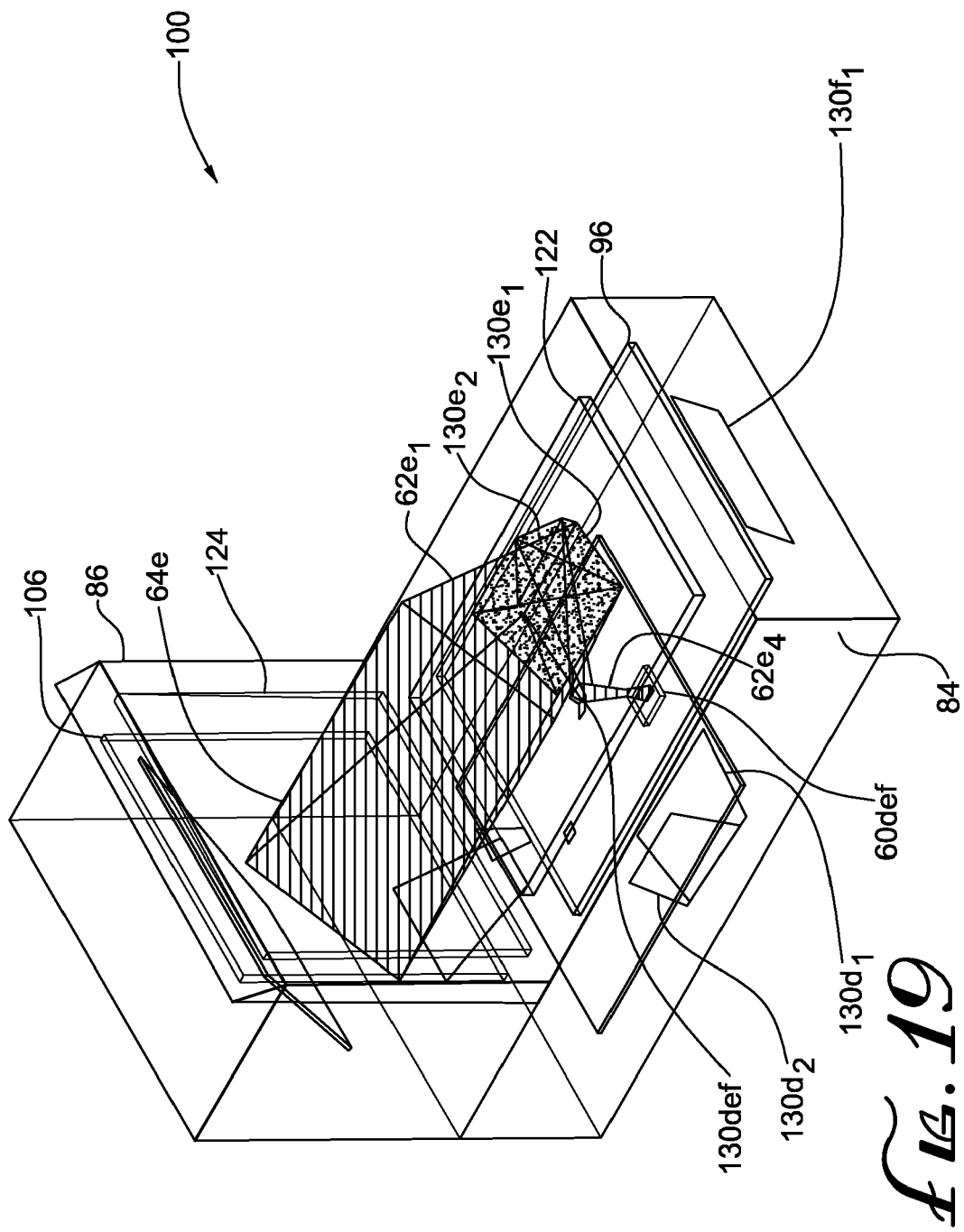

FIG. 18 is a front view and FIG. 19 is an isometric view of the optical reader 100 of FIGS. 6-9, the views illustrating mirrors 60e reflecting a right lower perspective of the view volume portion 64e along the image path 62e to the imager 60def of the optical code reader 100. The image of the object 20 in the view volume portion 64e being captured from the right lower perspective and propagated through the lower transparent plate 96 and the lower window 122 along a first image path segment $62e_1$ is reflected upwardly by a primary mirror $130e_1$ along a second image path segment $62e_2$ to a secondary mirror $130e_2$ which reflects the image sidewardly along a third image path segment $62e_3$ to a tertiary mirror 130def which reflects the image along a fourth image path segment $62e_4$ to the imager 60def that may be supported on the PCB 140. The tertiary mirror 130def of FIGS. 16-17 may comprise the tertiary mirror of 130def of FIG. 14-15, 16 or 17 previously described.

The upwardly and sidewardly direction of the image path 62e is particularly adept at obtaining an image of at the bottom side 28 and the trailing side 32 of the object 20 being passed through the view volume portion 64e. For purposes of description, FIGS. 18-19 illustrate the view volume portion 64e as being truncated, terminating at a planar location within the overall view volume 64 shown in FIG. 6. The overall view volume 64e from the window upward also generally illustrates the read region of best focus.

The image path 62e may be arranged so that it is bilaterally symmetrical with the image path 62d. However, in some embodiments, the image path 62e may be arranged to be asymmetrical with the image path 62d. The image may be focused by a suitable focusing lens positioned in front of the imager 60def.

Figure 20:
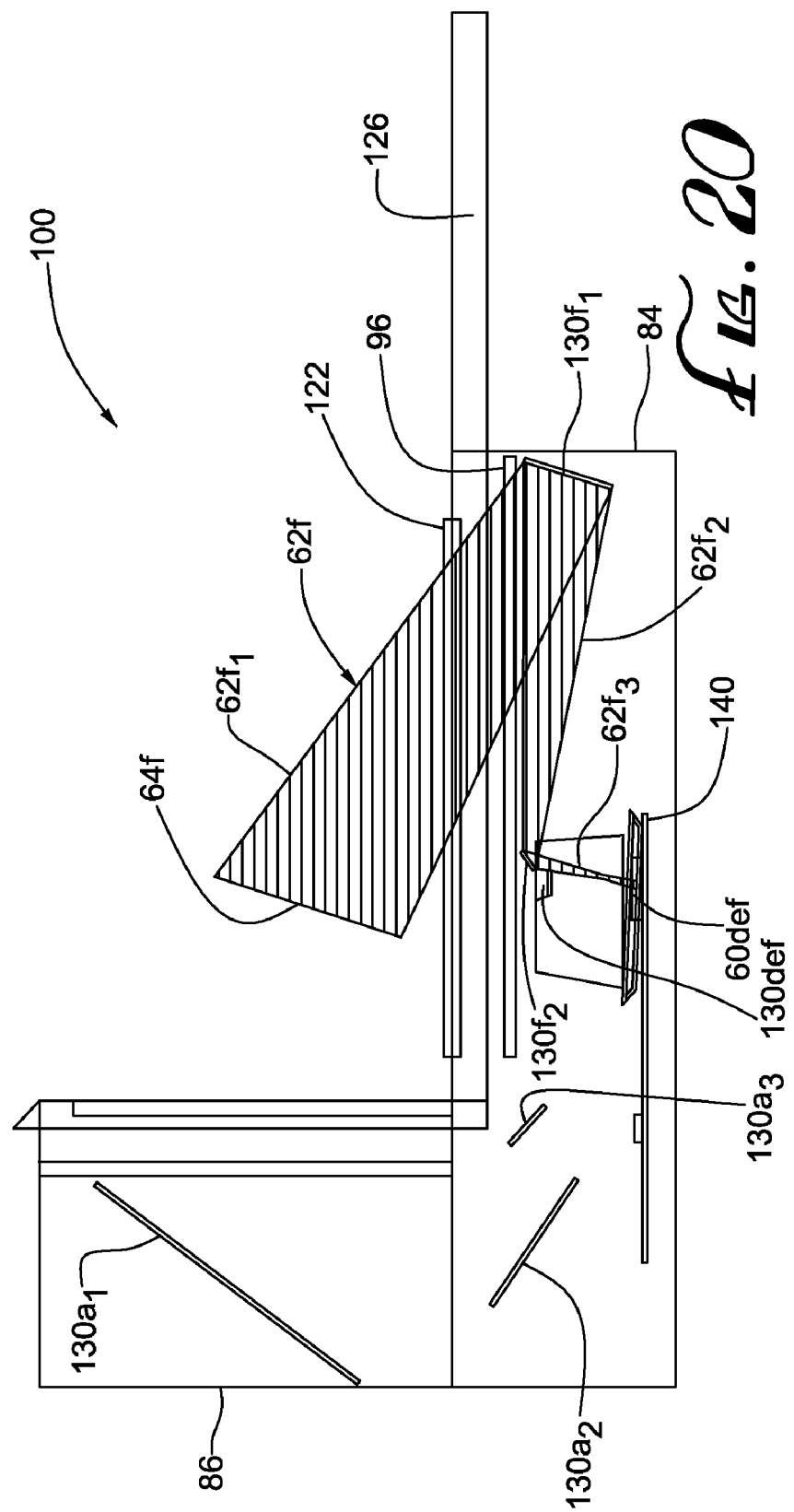
FIG. 20 is a side view and FIG. 21 is an isometric view of the optical reader of FIGS. 6-9, the views illustrating mirrors reflecting a back lower perspective of a view volume along an image path to an imager, the image path and view volume being shown with shading lines.
Figure 21:
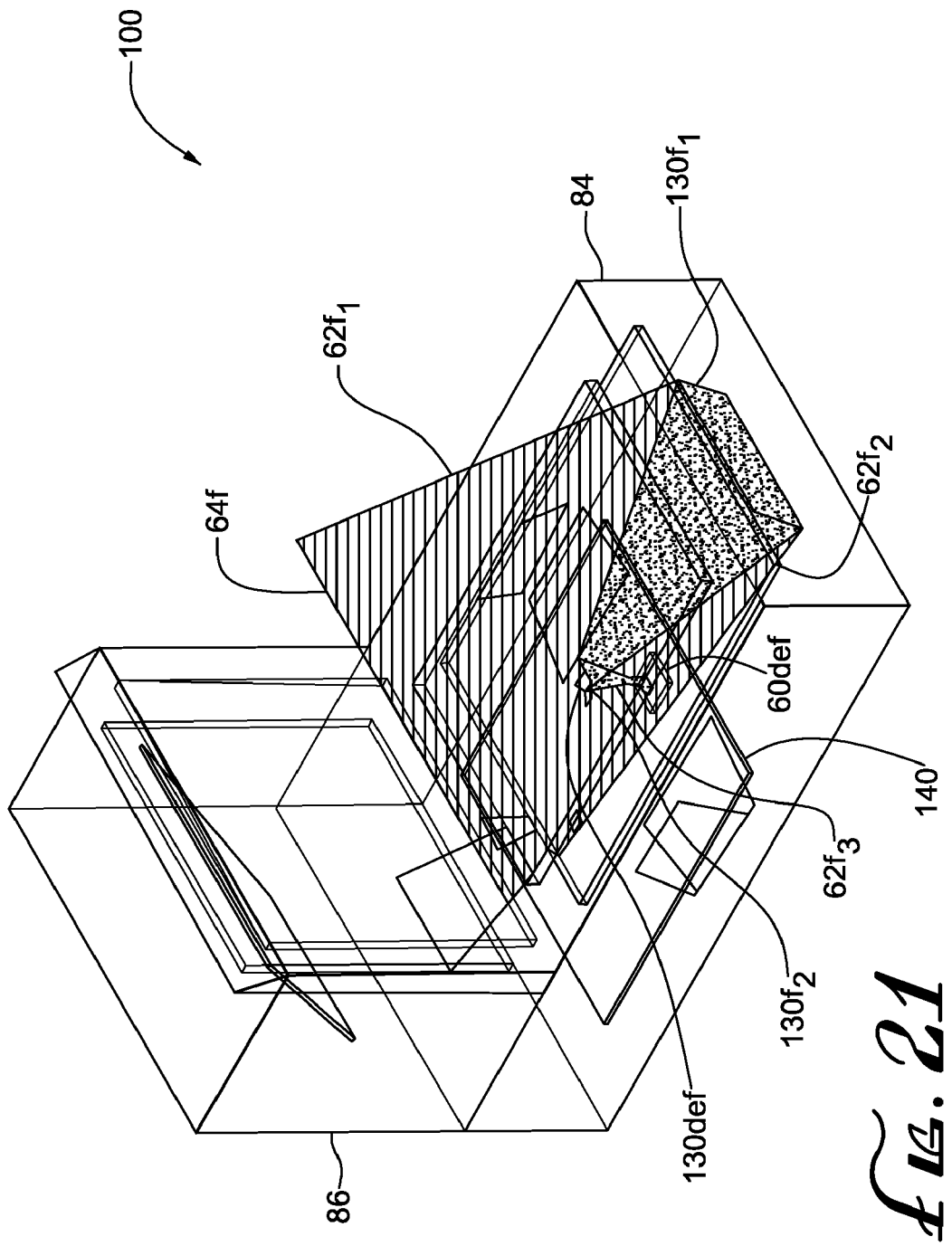

FIG. 20 is a side view and FIG. 21 is an isometric view the optical reader 100 of FIGS. 6-9, the views illustrating mirrors 130f reflecting a back lower perspective of a view volume portion 64f along an image path 62f to an imager 60def of the optical code reader 100. The image of the object 20 in the view volume portion 64f being captured from the back lower perspective and propagated through the lower transparent plate 96 along a first image path segment $62f_1$ is reflected sidewardly by a primary mirror $130f_1$ along a second image path segment $62f_2$ to a secondary mirror $130f_2$ which reflects the image downwardly along a third image path segment $62f_3$ to the imager 60def. The image may be focused by a suitable focusing lens positioned in front of the imager 60def.

The upwardly and sidewardly direction of the image path 62f is particularly adept at obtaining an image of at the checker side 34 and the bottom side 28 of the object 20 being passed through the view volume portion 64f. For purposes of description, FIGS. 20-21 illustrate the view volume portion 64f as being truncated, terminating at a planar location within the overall view volume 64 shown in FIG. 6. The overall view volume 64f from the window upward also generally illustrates the read region of best focus.

With reference to FIGS. 12-21, the image field 156 of the imager 60def may be split into three image field regions, such as a left region 162, a right region 164, and a back region 166, that may be adapted to capture images from the corresponding left lower perspective, right lower perspective, and back lower perspective, respectively. Thus, the tertiary mirror component 130$d_3$ reflects its image along the fourth image path 62$d_4$ onto the left region 162 of the image field 156 of the imager 130def; the tertiary mirror component 130$e_3$ reflects its image along the fourth image path 62$e_4$ onto the right region 164 of the image field 156 of the imager 130def; and the secondary mirror component 130$f_2$ reflects its image along the third image path 62$f_3$ onto the back region 166 of the image field 156 of the imager 130def. Exemplary imagers 60 that may be used for the described embodiments include wide VGA imagers (CMOS or CCD) with a resolution of 752×480 pixels for the imager 60a and megapixel imagers with a resolution of 1280×1024 pixels for the imager 60def. One preferred megapixel imager is the model EV76C560 1.3 MP CMOS image sensor available from e2V of Essex, England and Saint-Egrève, France. One preferred VGA imager is the model MT9V022 available from Aptina Imaging of San Jose, Calif. These imagers may be applicable to the data reader of any of the embodiments herein, however, any other suitable type of imager of various resolutions may be employed.

The image field 156 need not be square or rectangular and may, for example, be circular or have a profile of any suitable geometric shape. Similarly, the image field regions need not be square or rectangular and may, for example, have one or more curved edges. The image field regions may have the same or different sizes. For example, all three regions 162, 164, and 166 may have the same areas and perhaps even the same dimensions. In some embodiments, the left region 162 and right region 164 have the same areas dimensions, and the back region 166 has different dimensions (with the same area or different area) such as shown in FIG. 12. In some embodiments, all three regions 162, 164, and 166 may have the different areas and different dimensions such as shown in FIG. 13.

The focusing lenses that are proximate to the respective imagers, as well as the path lengths of the respective image path segments may provide control for both the depth of field for the respective image within the view volume.

The image captured by the image field 156 may be processed as a single image, but preferably however, the image captured by each image field region may be processed independently. The images from the different perspectives of the object 20 may reach the image field regions with the object being in the same orientation or in different orientations. Furthermore, the same enantiomorphic image of the object 20 from the different perspectives of the object 20 may reach the different image field regions or different enantiomorphic images of the object 20 may reach the different image fields. The different image field regions may have the same photosensitivities or be receptive to different intensities or wavelengths of light.

The optics arrangements described above may contain additional optical components such as filters, lenses, or other optical components may be optionally placed in some or all of the image paths 62. The mirror components may include optical components such as surface treatments designed to filter or pass certain light wavelengths. In some embodiments, the image reflected by each mirror component can be captured by the entire image field or view volume 64 when pulsed lighting and/or different wavelengths are used to separate the images obtained by the different perspectives. One or more lenses are preferably positioned within one or more of the image paths 62. The mirrors 130 preferably have planar reflecting surfaces. In some embodiments, however, one or more curved mirrors or focusing mirrors could be employed in one or more of the imaging paths 62 provided that appropriate lenses or image manipulating software is employed. In some embodiments, one or more of the mirrors 130 may be a dichroic mirror to provide for selective reflection of images under different wavelengths as is later described in greater detail.

The mirrors 130 may have quadrilateral profiles, but may have profiles of other polygons. In some preferred embodiments, one or more of the mirrors 130 have trapezoidal profiles. In some alternative embodiments, one or more of the mirrors 130 may have a circular or oval profile. The mirrors 130 may have dimensions sufficient for their respective locations to propagate an image large enough to occupy an entire image field of an imager 60. The mirrors 130 may also be positioned and have dimensions sufficiently small so that the mirrors do not occlude images being propagated along any of the other image paths 62.

The mirrors 130 may be appropriately spaced to account for the depth of field of the respective imagers 60. The imagers 60 may have different depths of field, and the image paths 62 may have different lengths, different segment lengths, and different numbers of mirrors 130. In some embodiments, the numbers of mirrors 130 in any image path 62 is selected to provide the fewest number of mirrors 130 in a housing of given dimensions. The image paths 62 may also or alternatively be modified to introduce additional mirrors 130 to select whether an actual image or whether a reverse image (enantiomorphic image) of the object will be received by any given imager 60. Moreover, the same enantiomorphic image of the object 20 from the different perspectives of the object 20 may reach the imagers 60 or different enantiomorphic images of the object 20 may reach the imagers 60. Exemplary imagers 60 that may be used include the 1.3 megapixel image sensor or the wide VGA imagers of 752×480 pixels (both these imagers are described above); however, any other suitable type of imager 60 of various resolutions may be employed.

The mirrors 130 not only facilitate to capture many different perspectives of an object 20, but also help to reduce the dimensions of a housing 82 needed to house all the imagers 60. For example, the image paths 62 from the imagers into the view volume 64 via the sets of mirrors 130 associated with the respective perspectives permits either or both of the lower and upper housing portions 84 and 86 to have at least one housing dimension that is smaller than a direct-perspective dimension for viewing the view volume from the same perspective directly.

In some embodiments, the imagers 60 may all be supported by or integrated with a common PCB 140 such as shown in FIG. 6. In some embodiments, such common PCB 140 may be located in the lower housing portion 84 or the upper housing portion 86; or, in cases where the lower and upper housing portions 84 and 86 form an integrated housing unit, the common PCB 140 may be located in intersecting portion of the housing 82.

In some embodiments, the imagers 60 may be located on opposing sides of the common PCB 140. In some embodiments, the same number of imagers 60 is located on each opposing side of the PCB 140; however, other embodiments employ different numbers of imagers 60 on the opposing sides of the PCB 140. In other embodiments, the imagers 60 may all be located on the same side of the PCB 140. In some embodiments, the common PCB 140 is a flexible circuit board with portions that can be selectively angled to orient some or all of the imagers 60 to facilitate arrangements of image paths 62 utilizing noncollinear axes for the image fields of the imagers 60.

In an alternative embodiment, the upper perspective and the back lower perspective may be reflected to a common imager, and the left and right perspectives may be reflected to a common imager. These common imagers may have split imaging fields divided equally or of different sizes. These imagers 60 may be located where the imagers 60a and 60def were located or they may be located differently with additional mirrors as warranted. These imagers may be located in the same housing portion or different housing portions, and they may share a common PCB 140 or be supported by different PCBs 140. The mirrors 130 used for reflecting images onto these imagers may be split mirrors or independent mirrors. In yet another configuration, all the upper, back, left and right perspectives may be reflected onto a common imager such as one having four sections.

In some embodiments, the transparent plates or windows 124, 106 or 122, 96 may be lens plates having optical properties designed to increase the size of an image, decrease the size of an image, correct for image distortion, have filtering properties, or some other optical function. The lower window 122 may be divided into multiple windows or window sections. For example, the reader may include three lower windows, one window for each of the image paths $62d_1$, $62e_1$ and $62f_1$.

Depending on the layout of the reader, the environment or the store/checkout stand arrangement, ambient lighting may be sufficient to provide adequate performance. In some embodiments, additional light sources may be added. For example, referring to FIGS. 6-7, light sources may comprise any suitable light source such as a row or array of LEDs (Light Emitting Diodes) 72, 74 mounted in/on the upper housing section 86 and a row/array of LEDs 76, 78 mounted in/on the lower housing section pointed into the view volume 64 and positioned to illuminate an object 20 with respect to one or more perspectives. The LEDs 72-78 may be disposed on the housing structure or may be mounted internally behind windows 106, 96. The arrays 72-78 are shown only diagrammatically. The LEDs 72, 74 are positioned behind window 106 and proximate to and on opposite lateral sides of mirror $130a_1$. LEDs 76, 78 are positioned below window 96 and proximate to and on opposite lateral sides of mirror $130f_1$. Though two LED arrays are shown in each housing section, fewer or more arrays may be employed. In some embodiments, different wavelengths of light are directed to illuminate different regions of an object for different perspectives. In some embodiments, the one or more of the light sources may be operated in a pulsed mode, the pulsing synchronized with the imager frame rate. In one example, the imagers may be selected with a frame rate of 30 Hz and one or more of the light sources used to illuminate the read region are pulsed at 60 Hz. Examples of light source pulsing is described in U.S. Pat. No. 7,234,641, hereby incorporated by reference.

Following are steps of a method for reading an optical code on an object in a view volume from multiple directions according to a preferred embodiment:

Step 1: positioning a first imager and a second imager within a reader housing and in at least approximately coplanar positions such that the first and second imagers are mountable on a common circuit board. In a preferred configuration, the first and second imagers are disposed in a reader housing includes an upper housing section including an upper aperture oriented generally vertically and a lower housing section including a lower aperture oriented generally horizontally.

Step 2: directing a first field of view of the first imager via a first mirror set from a position of the first imager into the view volume from a first perspective. In a preferred configuration, the first mirror set comprises a first set primary mirror, a first set secondary mirror and a first set tertiary mirror, and the step of directing a first field of view comprises passing the first field of view through the upper aperture, reflecting downwardly off the first set primary mirror to the first set secondary mirror, off the first set secondary mirror to the first set tertiary mirror, and off the first set tertiary mirror to the first imager.

Step 3: directing a second field of view of a first section of the second imager via a second mirror set from a position of the second imager into the view volume from a second perspective. In a preferred configuration, the second mirror set comprises a second set primary mirror, a second set secondary mirror and a second set tertiary mirror and the step of directing a second field of view comprises passing the second field of view through the lower aperture and reflecting upwardly off the second set primary mirror to the second set secondary mirror, off the second set secondary mirror to the second set tertiary mirror, and off the second set tertiary mirror to the second imager.

Step 4: forming a first image at the first imager of the first field of view into the view volume from the first perspective.

Step 5: forming a second image at the second imager of the second field of view into the view volume from the second perspective.

Step 6: processing the optical code based on one or more of the first and second images.

Further steps may include:

Step 7: directing a third field of view of the second imager via a third mirror set from a position of the second imager into the view volume from a third perspective through the lower aperture, the third mirror set comprising third set primary mirror, a third set secondary mirror and a third set tertiary mirror.

Step 8: forming a third image at the second imager of the third field of view into the view volume from the third perspective.

In the above example, the method is operative for viewing sides of a six-sided box-shaped object being passed through the view volume with a first side facing the upper aperture and a second bottom side facing the lower aperture, a third leading side, a fourth trailing side, a fifth side opposite the first side (the checker side), and a sixth top side and wherein the first perspective is from a vantage through the upper aperture capturing at least an image of the first side of the object; the second perspective is from a vantage through the lower aperture capturing at least an image of the second bottom side and the third leading side; and the third perspective is from a vantage through the lower aperture capturing at least an image of the second bottom side and the fourth trailing side.

Further steps may include:

Step 9: directing a fourth field of view of the second imager via a fourth mirror set from a position of the second imager into the view volume from a fourth perspective through the lower aperture. The fourth perspective is from a vantage through the at least one lower aperture capturing at least an image of the second bottom side and the side.

In addition to the variations and combinations previously presented, the various embodiments may advantageously employ lenses and light baffles, other arrangements, and/or image capture techniques disclosed in U.S. patent application Ser. No. 11/765,345, published as U.S. Pat. Pub. No. 2007/0297021), the disclosure of which is hereby incorporated by reference.

A fixed virtual scan line pattern (omnidirectional pattern 205 in FIG. 22) may be used to decode images such as used in the Magellan-1000i model scanner made by Datalogic Scanning, Inc. of Eugene, Oreg. In some embodiments, an alternative technique based on a vision library may be used with one or more of the imagers 60.

Figure 22:
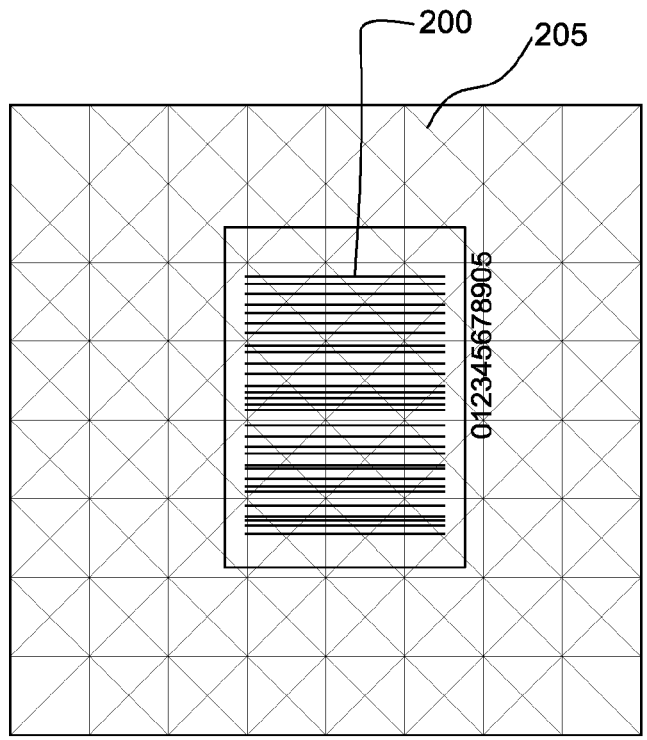
FIG. 22 is a diagram showing an image of a linear barcode 200 overlayed with an omnidirectional pattern of virtual scan lines.

In order to reduce the amount of memory and processing required to decode linear and stacked barcodes, an adaptive virtual scan line processing method may be employed. FIG. 22 shows an image of a linear barcode 200 overlayed with an omnidirectional pattern of virtual scan lines 205 (VSLs). The VSLs are linear subsets of the 2-D image, arranged at various angles and offsets. These virtual scan lines can be processed as a set of linear signals in a fashion conceptually similar to a flying spot laser scanner. The image can be deblurred with a one dimensional filter kernel instead of a full 2-D kernel, thereby reducing the processing requirements significantly.

The rotationally symmetric nature of the lens blurring function allows the linear deblurring process to occur without needing any pixels outside the virtual scan line boundaries. The virtual scan line is assumed to be crossing roughly orthogonal to the bars. The bars will absorb the blur spot modulation in the non-scanning axis, yielding a line spread function in the scanning axis. The resulting line spread function is identical regardless of virtual scan line orientation. However, because the pixel spacing varies depending on rotation (a 45 degree virtual scan line has a pixel spacing that is 1.4× larger than a horizontal or vertical scan line) the scaling of the deblurring equalizer needs to change with respect to angle.

Figure 23:
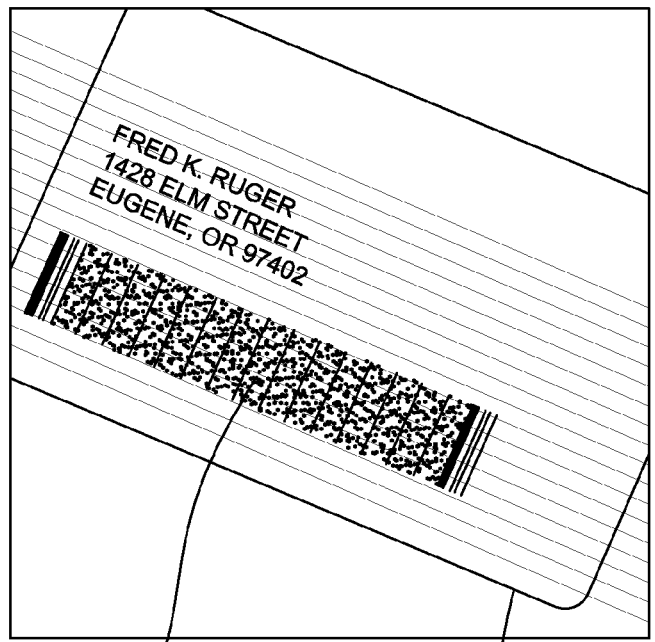
FIG. 23 is a diagram illustrating a stacked barcode symbology overlayed with a linear pattern.

If the imager acquires the image of a stacked barcode symbology, such as RSS or PDF-417 code 220 illustrated in FIG. 23, the imaging device can start with an omnidirectional virtual scan line pattern (such as the omnidirectional pattern 205 in FIG. 22) and then determine which scan lines may be best aligned to the barcode. The pattern may then be adapted for the next or subsequent frame to more closely align with the orientation and position of the barcode such as the closely-spaced parallel line pattern 225 in FIG. 23. Thus the device can read highly truncated barcodes and stacked barcodes with a low amount of processing compared to a reader that processes the entire image in every frame.

Partial portions of an optical code (from multiple perspectives) may be combined to form a complete optical code by a process known as stitching. Though stitching may be described herein by way of example to a UPCA label, one of the most common types of optical code, it should be understood that stitching can be applied to other type of optical labels. The UPCA label has "guard bars" on the left and right side of the label and a center guard pattern in the middle. Each side has 6 digits encoded. It is possible to discern whether either the left half or the right half is being decoded. It is possible to decode the left half and the right half separately and then combine or stitch the decoded results together to create the complete label. It is also possible to stitch one side of the label from two pieces. In order to reduce errors, it is required that these partial scans include some overlap region. For example, denoting the end guard patterns as G and the center guard pattern as C and then encoding the UPCA label 012345678905, the label could be written as G012345C678905G.

Stitching left and right halves would entail reading G012345C and C678905G and putting that together to get the full label. Stitching a left half with a 2-digit overlap might entail reading G0123 and 2345C to make G012345C. One example virtual scan line decoding system may output pieces of labels that may be as short as a guard pattern and 4 digits. Using stitching rules, full labels can assembled from pieces decoded from the same or subsequent images from the same camera or pieces decoded from images of multiple cameras. Further details of stitching and virtual line scan methods are described in U.S. Pat. Nos. 5,493,108 and 5,446,271, which are herein incorporated by reference.

In some embodiments, a data reader includes an image sensor that is progressively exposed to capture an image on a rolling basis, such as a CMOS imager with a rolling shutter. The image sensor is used with a processor to detect and quantify ambient light intensity. Based on the intensity of the ambient light, the processor controls integration times for the rows of photodiodes of the CMOS imager. The processor may also coordinate when a light source is pulsed based on the intensity of the ambient light and the integration times for the photodiode rows.

Depending on the amount of ambient light and the integration times, the light source may be pulsed one or more times per frame to create stop-motion images of a moving target where the stop-motion images are suitable for processing to decode data represented by the moving target. Under bright ambient light conditions, for example, the processor may cause the rows to sequentially integrate with a relatively short integration time and without pulsing the light source, which creates a slanted image of a moving target. Under medium light conditions, for example, the rows may integrate sequentially and with an integration time similar to the integration time for bright ambient light, and the processor pulses the light source several times per frame to create a stop-motion image of a moving target with multiple shifts between portions of the image. The image portions created when the light pulses may overlie a blurrier, slanted image of the moving target. Under low light conditions, for example, the processor may cause the rows to sequentially integrate with a relatively long integration time and may pulse the light source once when all the rows are integrating during the same time period. The single pulse of light creates a stop-motion image of a moving target that may overlie a blurrier, slanted image of the moving target.

In some embodiments, a data imager contains multiple CMOS imagers and has multiple light sources. Different CMOS imagers "see" different light sources, in other words, the light from different light sources is detected by different CMOS imagers. Relatively synchronized images may be captured by the multiple CMOS imagers without synchronizing the CMOS imagers when the CMOS imagers operate at a relatively similar frame rate. For example, one CMOS imager is used as a master so that all of the light sources are pulsed when a number of rows of the master CMOS imager are integrating.

Another embodiment pulses a light source more than once per frame. Preferably, the light source is pulsed while a number of rows are integrating, and the number of integrating rows is less than the total number of rows in the CMOS imager. The result of dividing the total number of rows in the CMOS imager by the number of integrating rows is an integer in some embodiments. Alternatively, in other embodiments, the result of dividing the total number of rows in the CMOS imager by the number of integrating rows is not an integer. When the result of dividing the total number of rows in the CMOS by the number of integrating rows is an integer, image frames may be divided into the same sections for each frame. On the other hand, when the result of dividing the total number of rows in the CMOS by the number of integrating rows is not an integer, successive image frames are divided into different sections.

Other embodiments may use a mechanical shutter in place of a rolling shutter to capture stop-motion images of a moving target. The mechanical shutter may include a flexible member attached to a shutter that blocks light from impinging a CMOS or other suitable image sensor. The shutter may be attached to a bobbin that has an electrically conductive material wound around a spool portion of the bobbin, where the spool portion faces away from the shutter. The spool portion of the bobbin may be proximate one or more permanent magnets. When an electric current runs through the electrically conductive material wound around the spool, a magnetic field is created and interacts with the magnetic field from the one or more permanent magnets to move the shutter to a position that allows light to impinge a CMOS or other suitable image sensor.

These and other progressive imaging techniques are described in detail in U.S. patent application Ser. No. 12/642,499 filed Dec. 18, 2009 entitled "SYSTEMS AND METHODS FOR IMAGING," hereby incorporated by reference.

It is intended that subject matter disclosed in portion herein can be combined with the subject matter of one or more of other portions herein as long as such combinations are not mutually exclusive or inoperable.

In addition, many variations, enhancements and modifications of the imager-based optical code reader concepts described herein are possible. For example, split mirrors 130 and/or sets of multiple fold mirrors 130 can be employed in alternative embodiments of the optical code reader that obtains views from only one of the upper or lower perspective.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A method for reading an optical code on an object in a view volume from multiple directions, comprising the steps of:
    positioning a first imager and a second imager within a reader housing and in at least approximately co-planar positions such that the first and second imagers are mountable on a common circuit board;
    directing a first field of view of the first imager via a first mirror set from a position of the first imager into the view volume from a first perspective onto a first side of the object;
    directing a second field of view of a first predetermined section of the second imager via a second mirror set from a position of the second imager into the view volume from a second perspective onto a second side of the object;
    directing a third field of view of a second predetermined section of the second imager via a third mirror set from a position of the second imager into the view volume from a third perspective onto a third side of the object;
    capturing a first image at the first imager of the first field of view into the view volume from the first perspective;
    capturing a second image at the first predetermined section of the second imager of the second field of view into the view volume from the second perspective;
    capturing a third image at the second predetermined section of the second imager of the third field of view into the view volume from the third perspective;
    processing and decoding the optical code based on one or more of the first, second and third images.

2. A method according to claim 1, wherein the optical code is a one-dimensional optical code.

3. A method according to claim 1, further comprising:
    attempting to decode the optical code along a set of virtual scan lines across the first image; and
    attempting to decode the optical code along a set of virtual scan lines across the second image.

4. A method according to claim 1 wherein at least one of the imagers is selected from the group consisting of: a 2-D sensor array, CMOS imager, and CCD array.

5. A method according to claim 1, wherein the reader housing includes an upper housing section including an upper aperture oriented generally vertically and a lower housing section including a lower aperture oriented generally horizontally, wherein the method is operative for viewing sides of a six sided box-shaped object being passed through the view volume with a first side facing the upper aperture and a bottom side facing the lower aperture, wherein the first perspective is from a vantage through the upper aperture and the second perspective is from a vantage through the lower aperture.

6. A method according to claim 1 wherein the reader housing includes an upper housing section including an upper aperture oriented generally vertically and a lower housing section including a lower aperture oriented generally horizontally,
    wherein the second set of mirrors comprises a second set primary mirror, a second set secondary mirror and a second set tertiary mirror,
    wherein the step of directing a second field of view comprises passing the second field of view through the lower aperture and reflecting upwardly off the second set primary mirror to the second set secondary mirror, off the second set secondary mirror to the second set tertiary mirror, and off the second set tertiary mirror to the second imager.

7. A method according to claim 6, wherein the method is operative for viewing sides of a six-sided box-shaped object being passed through the view volume with a first side facing the upper aperture and a second bottom side facing the lower aperture, a third leading side, a fourth trailing side, a fifth side opposite the first side, and a sixth top side and wherein the first perspective is from a vantage through the upper aperture capturing at least an image of the first side of the object and the second perspective is from a vantage through the lower aperture capturing at least an image of the second bottom side and the third leading side.

8. A method for reading an optical code on an object in a view volume from multiple directions, comprising the steps of:
    positioning a first imager and a second imager within a reader housing and in at least approximately co-planar positions such that the first and second imagers are mountable on a common circuit board, wherein the reader housing includes an upper housing section including an upper aperture oriented generally vertically and a lower housing section including a lower aperture oriented generally horizontally;
    directing a first field of view of the first imager via a first set of mirrors from a position of the first imager into the view volume from a first perspective onto a first side of the object, wherein the first set of mirrors comprises a first set primary mirror, a first set secondary mirror and a first set tertiary mirror, wherein the step of directing a first field of view comprises passing the first field of view through the upper aperture, reflecting primarily downwardly off the first set primary mirror to the first set secondary mirror, reflecting off the first set secondary mirror to the first set tertiary mirror, and reflecting primarily downwardly off the first set tertiary mirror to the first imager;
    directing a second field of view of a first predetermined section of the second imager via a second set of mirrors from a position of the second imager into the view volume from a second perspective, wherein the second set of mirrors comprises a second set primary mirror, a second set secondary mirror and a second set tertiary mirror onto a second side of the object, wherein the step of directing a second field of view comprises passing the second field of view through the lower aperture and reflecting upwardly off the second set primary mirror to the second set secondary mirror, off the second set secondary mirror to the second set tertiary mirror, and off the second set tertiary mirror to the second imager;

directing a third field of view of a second predetermined section of the second imager via a third mirror set from a position of the second imager into the view volume from a third perspective onto a third side of the object;

capturing a first image at the first imager of the first field of view into the view volume from the first perspective;

capturing a second image at the first predetermined section of the second imager of the second field of view into the view volume from the second perspective;

capturing a third image at the second predetermined section of the second imager of the third field of view into the view volume from the third perspective;

processing and decoding the optical code based on one or more of the first, second, and third images.

9. A method for reading an optical code on an object in a view volume from multiple directions, comprising the steps of:

positioning a first imager and a second imager within a reader housing and in at least approximately co-planar positions such that the first and second imagers are mountable on a common circuit board, wherein the reader housing includes an upper housing section including an upper aperture oriented generally vertically and a lower housing section including a lower aperture oriented generally horizontally;

directing a first field of view of the first imager via a first set of mirrors from a position of the first imager into the view volume from a first perspective onto a first side of the object;

directing a second field of view of a first predetermined section of the second imager via a second set of mirrors from a position of the second imager into the view volume from a second perspective onto a second side of the object, wherein the second set of mirrors comprises a second set primary mirror, a second set secondary mirror and a second set tertiary mirror, wherein the step of directing a second field of view comprises passing the second field of view through the lower aperture and reflecting upwardly off the second set primary mirror to the second set secondary mirror, off the second set secondary mirror to the second set tertiary mirror, and off the second set tertiary mirror to the second imager;

capturing a first image at the first imager of the first field of view into the view volume from the first perspective;

capturing a second image at the second imager of the second field of view into the view volume from the second perspective;

directing a third field of view of a second predetermined section of the second imager via a third set of mirrors from a position of the second imager into the view volume from a third perspective through the lower aperture onto a third side of the object, the third mirror set comprising third set primary mirror, a third set secondary mirror and a third set tertiary mirror;

capturing a third image at the second imager of the third field of view into the view volume from the third perspective;

processing and decoding the optical code based on one or more of the first, second, and third images.

10. A method according to claim 9, wherein the step of directing a third field of view comprises passing the third field of view through the lower aperture and reflecting upwardly off the third primary mirror to the third secondary mirror, off the third secondary mirror to the third tertiary mirror, off the third tertiary mirror to the second imager, wherein the third perspective is from a vantage through the lower aperture capturing at least an image of the second bottom side and the fourth trailing side of the object.

11. A method according to claim 9 wherein the second imager includes a plurality of regions including the first predetermined section, the second predetermined section, and a third predetermined section.

12. An optical code reader operable to read an optical code off an object comprising a housing including an upper housing section and a lower housing section formed in a generally L-shape, the lower housing section including at least one lower aperture and the upper housing section having an upper aperture, the upper and lower housing sections forming a view volume therebetween;

a first imager disposed in the housing and a second imager disposed in the housing;

a first set of mirrors for directing a first perspective of a first side of an object in the view volume through the upper aperture along a first image path to the first imager;

a second set of mirrors for directing a second perspective of a second side of the object in the view volume through the at least one lower aperture along a second path to a first predetermined section of the second imager;

a third set of mirrors for directing a third perspective of a third side of the object in the view volume through the at least one lower aperture along a third path to a second predetermined section of the second imager;

wherein the second mirror set includes a second set primary mirror, a second set secondary mirror and a second set tertiary mirror, the second perspective of the object being reflected from the second set primary mirror upwardly to the second set secondary mirror, then to the second set tertiary mirror, and then to the second imager, wherein the third mirror set includes a third set primary mirror, a third set secondary mirror and a third set tertiary mirror, the third perspective of the object being reflected from the third set primary mirror upwardly to the third set secondary mirror, then to the third set tertiary mirror, and then to the second imager, and wherein the optical code reader is operable to decode the optical code off the object based on one or more of the first, second, and third sides of the object directed to the first and second imagers.

13. An optical reader according to claim 12 further comprising a fourth mirror set for directing a fourth perspective of the object in the view volume through the at least one lower aperture along a fourth path to the second imager.

14. An optical reader according to claim 13 wherein the optical reader is operative for viewing sides of a six-sided box-shaped object being passed through the view volume with a first side of the object facing the upper aperture and a second bottom side facing the lower aperture, a third leading side, a fourth trailing side, a fifth side opposite the first side, and a sixth top side, and wherein the first perspective is from a vantage through the upper aperture capturing at least an image of the first side of the object and the second perspective is from a vantage through the at least one lower aperture capturing at least an image of the second bottom side and the third leading side.

15. An optical reader according to claim 13 wherein the third perspective is from a vantage through the at least one lower aperture capturing at least an image of the second bottom side of the object and the fourth trailing side, and the fourth perspective is from a vantage through the at least one lower aperture capturing at least an image of the second bottom side and the fifth side.

16. An optical reader according to claim 12 wherein the first mirror set includes a first set primary mirror, a first set secondary mirror and a first set tertiary mirror, the first perspective of the object being reflected from the first set primary mirror downwardly to the first set secondary mirror, then to the first set tertiary mirror, and then to the first imager.

17. An optical code reader according to claim 12, wherein the imagers are selected from the group consisting of: CMOS devices, CCD devices, 2D sensor arrays, and area imagers.

18. An optical code reader according to claim 12, wherein the first and second imagers acquire respective views simultaneously.

19. A method for obtaining images from multiple views associated with respective perspectives of a three-dimensional object with an optical code within a view volume, comprising:

providing a housing;

providing, within the housing, a first imager having a first image field; arranging, within the housing, a first set of fold mirrors to reflect a first view associated with a first perspective of the view volume onto a first predetermined image region of the first image field, the first predetermined image region capturing at least a first image from a first side of the three-dimensional object passing through the view volume;

arranging, within the housing, a second set of fold mirrors to reflect a second view associated with a second perspective of the view volume onto a second predetermined image region of the first image field, the second predetermined image region capturing at least a second image from a second side of the three-dimensional object passing through the view volume, the second side of the three-dimensional object being different from the first side, such that the imager acquires perspectives of views of more than one side of the three-dimensional object;

arranging, within the housing, a second imager with a corresponding second image field operable to capture at least a third image from a third side of the three-dimensional object; and processing and decoding the optical code of the object based on at least one of the first second, and third images.

* * * * *